(12) United States Patent
Waku

(10) Patent No.: US 10,416,888 B2
(45) Date of Patent: Sep. 17, 2019

(54) PARALLEL PROCESSING DEVICE, METHOD FOR CONTROLLING PARALLEL PROCESSING DEVICE, AND CONTROLLER USED IN PARALLEL PROCESSING DEVICE

(71) Applicant: Fujitsu Limited, Kawasaki-shi, Kanagawa (JP)

(72) Inventor: Akihiro Waku, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 133 days.

(21) Appl. No.: 15/686,768

(22) Filed: Aug. 25, 2017

(65) Prior Publication Data

US 2018/0074712 A1 Mar. 15, 2018

(30) Foreign Application Priority Data

Sep. 9, 2016 (JP) ................................ 2016-176360

(51) Int. Cl.
*G06F 3/06* (2006.01)
*G06F 9/50* (2006.01)
*G06F 15/177* (2006.01)

(52) U.S. Cl.
CPC ............ *G06F 3/0604* (2013.01); *G06F 3/067* (2013.01); *G06F 3/0638* (2013.01); *G06F 3/0659* (2013.01); *G06F 9/5066* (2013.01); *G06F 15/177* (2013.01)

(58) Field of Classification Search
CPC .... G06F 3/0604; G06F 3/0659; G06F 3/0638; G06F 3/067; G06F 9/5066; G06F 15/177
See application file for complete search history.

(56) References Cited

U.S. PATENT DOCUMENTS

| 9,779,128 B2 * | 10/2017 | Cai ..................... G06F 16/2379 |
| 2005/0257028 A1 | 11/2005 | Guffens et al. |
| 2010/0064291 A1 * | 3/2010 | Aila .................... G06F 9/30036 718/104 |
| 2012/0278565 A1 | 11/2012 | Yamasaki et al. |

FOREIGN PATENT DOCUMENTS

| JP | 6-214763 | 8/1994 |
| JP | 2001-209623 | 8/2001 |
| JP | 2005-332361 | 12/2005 |
| JP | 2007-328484 | 12/2007 |
| JP | 2012-230597 | 11/2012 |

\* cited by examiner

*Primary Examiner* — Hiep T Nguyen
(74) *Attorney, Agent, or Firm* — Staas & Halsey LLP

(57) ABSTRACT

A parallel processing device includes a management unit, a plurality of nodes, and a controller that controls each of the plurality of nodes in accordance with a first command transmitted from the management unit. The controller includes a command storage that stores a second command generated a previous time, a command type identification unit that identifies a command type of the first command transmitted from the management unit, and a command generator that generates a third command by using the second command according to the command type.

12 Claims, 16 Drawing Sheets

| | |
|---|---|
| bit[0:N-1] | A. CONTROL INFORMATION THAT CHANGES EVERY TIME IN CONTINUOUS COMMANDS, SUCH AS DATA |
| bit[N:M-1] | B1. CONTROL INFORMATION 1 THAT CHANGES ONLY AT LOW FREQUENCY IN CONTINUOUS COMMANDS, SUCH AS DESTINATION, ADDRESS LENGTH, OR PRESENCE/ABSENCE OF CRC |
| bit[M:P-1] | B2. CONTROL INFORMATION 2 THAT CHANGES ONLY AT LOW FREQUENCY IN CONTINUOUS COMMANDS, SUCH AS DESTINATION, ADDRESS LENGTH, OR PRESENCE/ABSENCE OF CRC |
| .. | .. |
| bit[P-1:Q] | BX. CONTROL INFORMATION X THAT CHANGES ONLY AT LOW FREQUENCY IN CONTINUOUS COMMANDS, SUCH AS DESTINATION, ADDRESS LENGTH, OR PRESENCE/ABSENCE OF CRC |

F I G. 3 A

|  | COMMAND TYPE |
|---|---|
| 0x0 | DIRECT COMMAND1 |
| 0x1 | ADDRESS-SKIP COMMAND1-1 |
| 0x2 | ADDRESS-SKIP COMMAND1-2 |
| 0x3 | ADDRESS-SKIP COMMAND1-3 |

| | [DIRECT COMMAND1] | [ADDRESS-SKIP COMMAND1-1] | [ADDRESS-SKIP COMMAND1-2] | [ADDRESS-SKIP COMMAND1-3] |
|---|---|---|---|---|
| bit[0:1] | | | | |
| bit[2:N+1] | A. CONTROL INFORMATION THAT CHANGES EVERY TIME IN CONTINUOUS COMMANDS, SUCH AS DATA | A. CONTROL INFORMATION THAT CHANGES EVERY TIME IN CONTINUOUS COMMANDS, SUCH AS DATA | A. CONTROL INFORMATION THAT CHANGES EVERY TIME IN CONTINUOUS COMMANDS, SUCH AS DATA | A. CONTROL INFORMATION THAT CHANGES EVERY TIME IN CONTINUOUS COMMANDS, SUCH AS DATA |
| bit[N+2:M+1] | B1. CONTROL INFORMATION 1 THAT CHANGES ONLY AT LOW FREQUENCY IN CONTINUOUS COMMANDS, SUCH AS DESTINATION, ADDRESS LENGTH, OR PRESENCE/ABSENCE OF CRC | B1. CONTROL INFORMATION 1 THAT CHANGES ONLY AT LOW FREQUENCY IN CONTINUOUS COMMANDS, SUCH AS DESTINATION, ADDRESS LENGTH, OR PRESENCE/ABSENCE OF CRC | B1. CONTROL INFORMATION 1 THAT CHANGES ONLY AT LOW FREQUENCY IN CONTINUOUS COMMANDS, SUCH AS DESTINATION, ADDRESS LENGTH, OR PRESENCE/ABSENCE OF CRC | |
| bit[M+1:P+1] | B2. CONTROL INFORMATION 2 THAT CHANGES ONLY AT LOW FREQUENCY IN CONTINUOUS COMMANDS, SUCH AS DESTINATION, ADDRESS LENGTH, OR PRESENCE/ABSENCE OF CRC | B2. CONTROL INFORMATION 2 THAT CHANGES ONLY AT LOW FREQUENCY IN CONTINUOUS COMMANDS, SUCH AS DESTINATION, ADDRESS LENGTH, OR PRESENCE/ABSENCE OF CRC | | |
| ... | | | | |
| bit[P+1:Q+1] | BX. CONTROL INFORMATION X THAT CHANGES ONLY AT LOW FREQUENCY IN CONTINUOUS COMMANDS, SUCH AS DESTINATION, ADDRESS LENGTH, OR PRESENCE/ABSENCE OF CRC | | | |

FIG. 3B

| ADDRESS | BYTE | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0x0000 | Command0 | | | | | | | | Command1 | | | | | | | | Command2 | | | | | | | | Command3 | | | | | | | |
| 0x0020 | Command4 | | | | | | | | Command5 | | | | | | | | Command6 | | | | | | | | Command7 | | | | | | | |
| 0x0040 | Command8 | | | | | | | | Command9 | | | | | | | | Command10 | | | | | | | | Command11 | | | | | | | |
| 0x0080 | Command12 | | | | | | | | Command13 | | | | | | | | Command14 | | | | | | | | Command15 | | | | | | | |

F I G. 4 A

| ADDRESS | BYTE | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0x0000 | Command0 | | | | | | | | Command1 | | | | Command2 | | | | Command3 | | | | Command4 | | | | Command5 | | | | Command6 | | | |
| 0x0020 | Command7 | | | | Command8 | | | | Command9 | | | | Command10 | | | | Command11 | | | | Command12 | | | | | | | | | | | |
| 0x0040 | Command13 | | | | Command14 | | | | Command15 | | | | | | | | | | | | | | | | | | | | | | | |
| 0x0080 | | | | | | | | | | | | | | | | | | | | | | | | | | | | | | | | |

F I G. 4 B

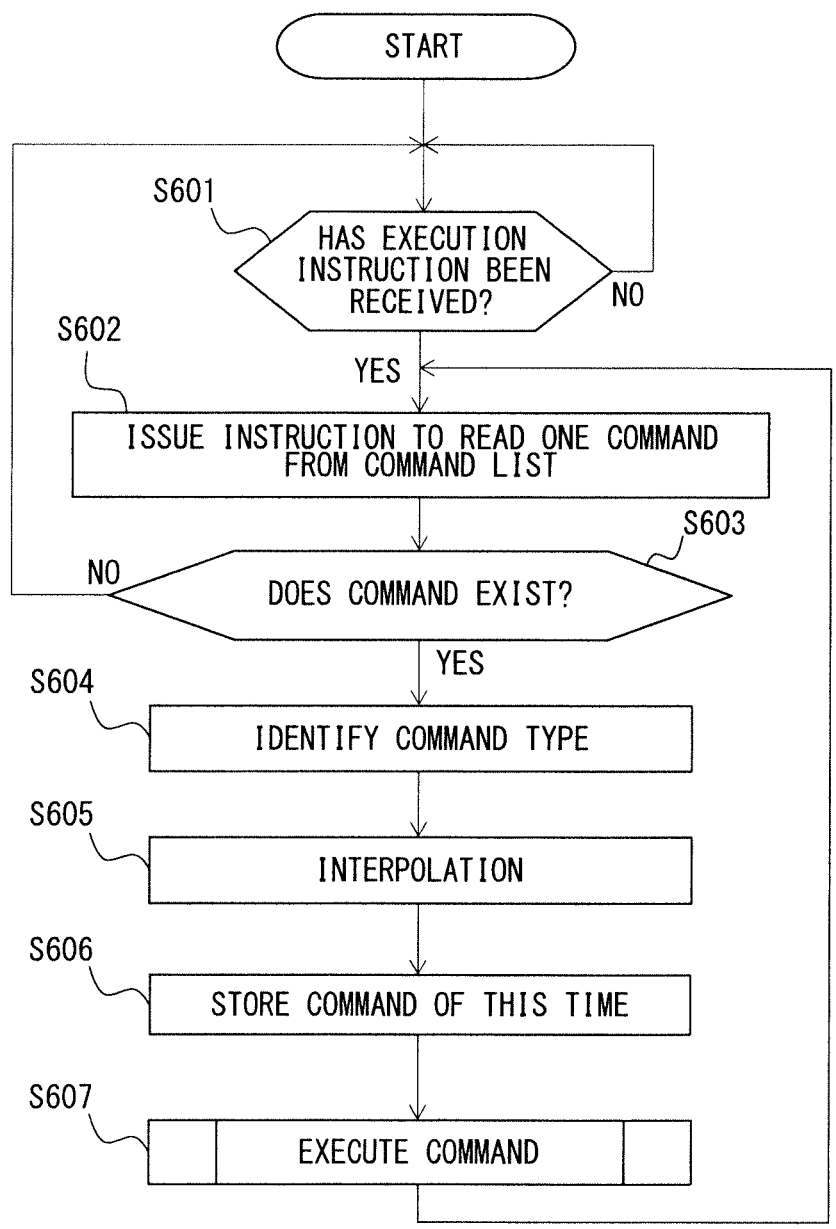
F I G. 6

| | COMMAND TYPE | |
|---|---|---|
| bit[0] | 0x0 | DIRECT COMMAND2 |
| | 0x1 | ADDRESS-SKIP COMMAND2 |

| | [DIRECT COMMAND2] | [ADDRESS-SKIP COMMAND2] |
|---|---|---|
| bit[1 : N] | A. CONTROL INFORMATION THAT CHANGES EVERY TIME IN CONTINUOUS COMMANDS, SUCH AS DATA | A. CONTROL INFORMATION THAT CHANGES EVERY TIME IN CONTINUOUS COMMANDS, SUCH AS DATA |
| bit[N+1 : M] | B1. CONTROL INFORMATION 1 THAT CHANGES ONLY AT LOW FREQUENCY IN CONTINUOUS COMMANDS, SUCH AS DESTINATION, ADDRESS LENGTH, OR PRESENCE/ABSENCE OF CRC | |
| bit[M+1 : P] | B2. CONTROL INFORMATION 2 THAT CHANGES ONLY AT LOW FREQUENCY IN CONTINUOUS COMMANDS, SUCH AS DESTINATION, ADDRESS LENGTH, OR PRESENCE/ABSENCE OF CRC | |
| : | : | |
| bit[Q+1 : R] | BX. CONTROL INFORMATION X THAT CHANGES ONLY AT LOW FREQUENCY IN CONTINUOUS COMMANDS, SUCH AS DESTINATION, ADDRESS LENGTH, OR PRESENCE/ABSENCE OF CRC | |

FIG. 8

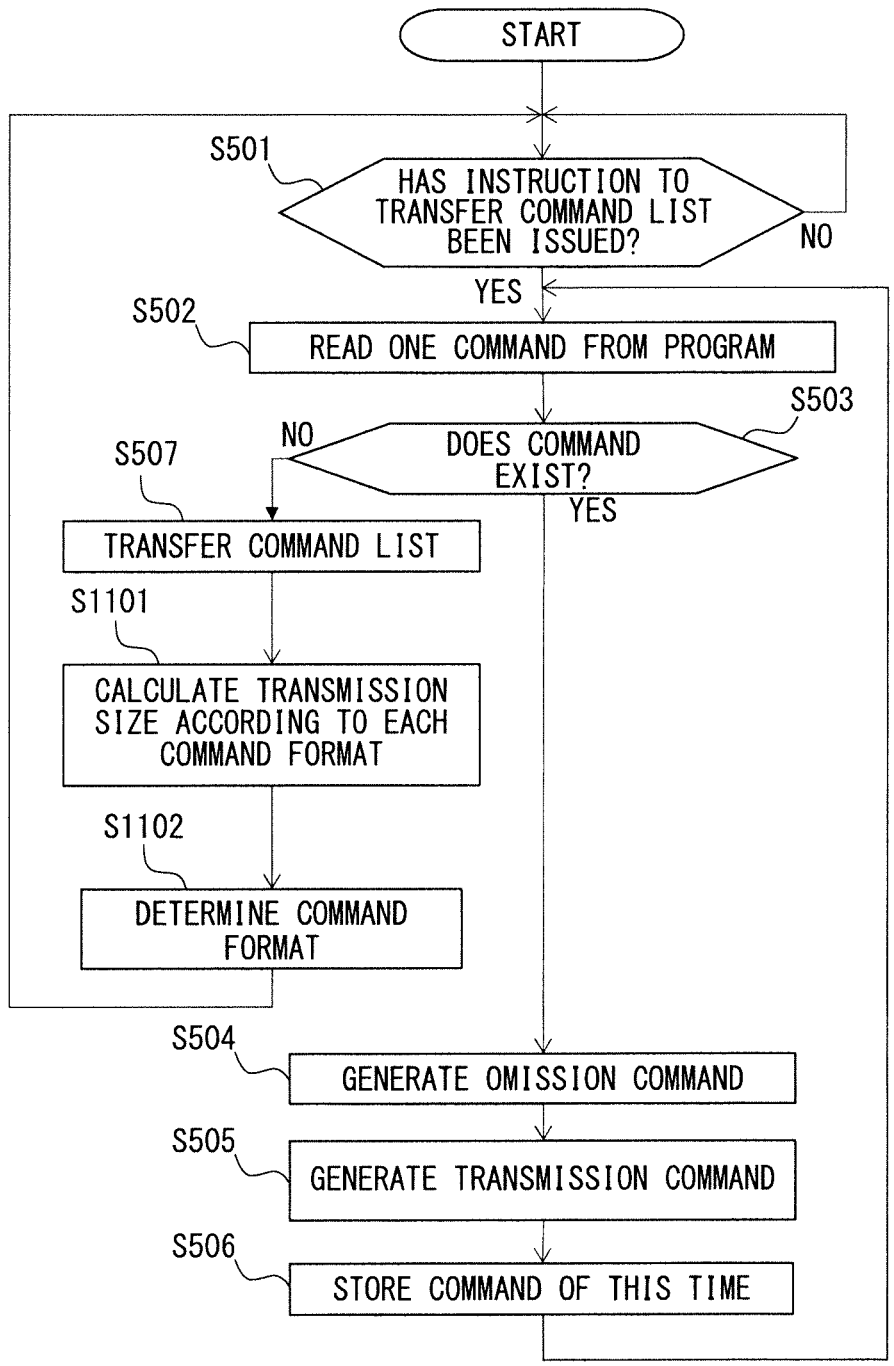
F I G. 1 1

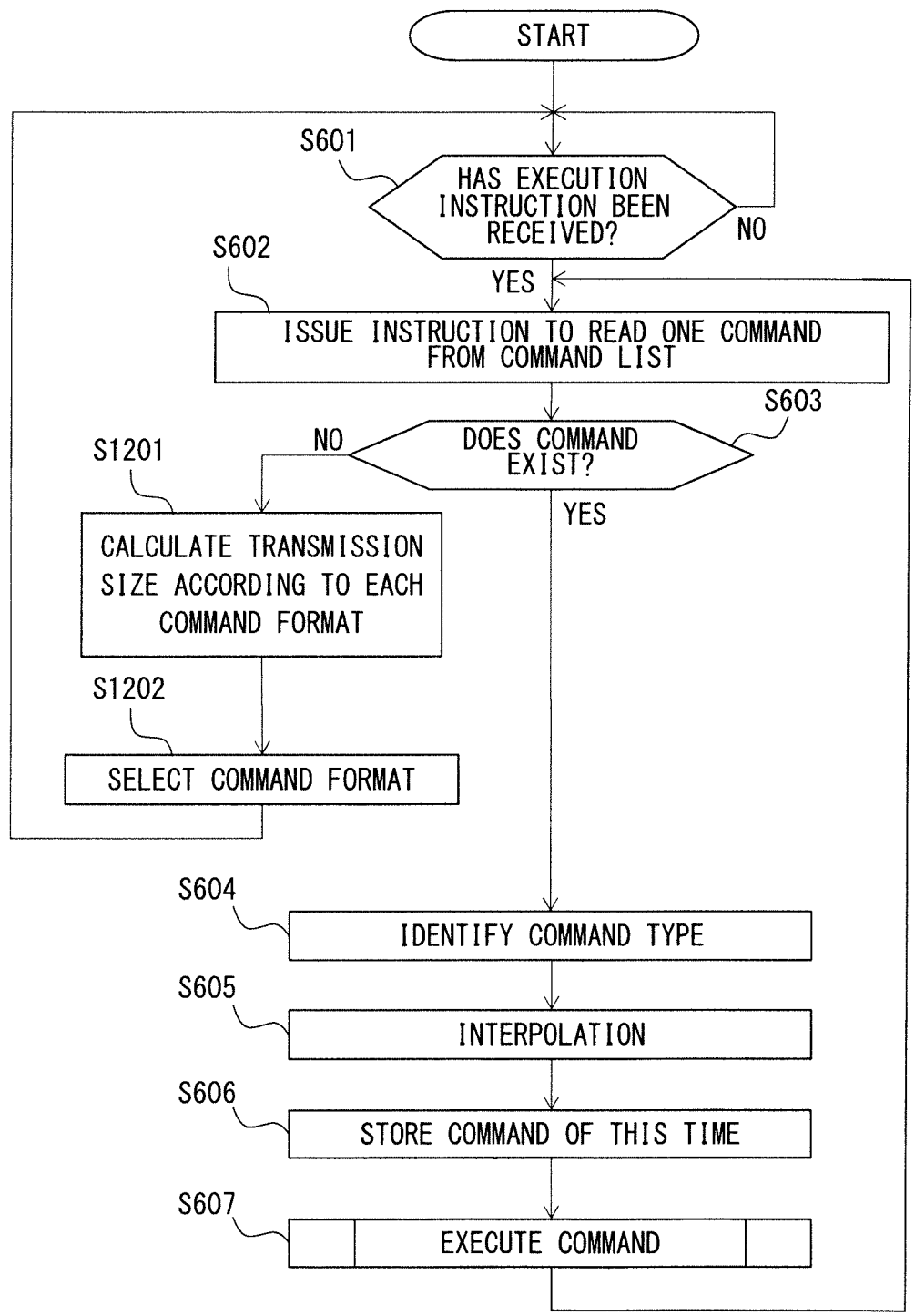
F I G. 1 2

| Byte0 | bit7:6 | Don't care (0 PADDING) | |
|---|---|---|---|
| | bit5 | I2C RW | |
| | | 0x0 | I2C Write |
| | | 0x1 | I2C Read |
| | | [I2C Write] | [I2C Read] |
| | bit4:0 | Data Length(0~16Byte) | |
| Byte1 | bit7:5 | Header Length(0~4Byte) | |
| | bit4 | Count    0: Count ABSENT / 1: Count PRESENT | |
| | bit3 | CRC      0: CRC ABSENT / 1: CRC PRESENT | |
| | bit2 | Don't care (0 PADDING) | |
| | bit1:0 | Controller(0~3) | |
| Byte2 | bit7:1 | Slave Address | |
| | bit0 | Don't care (0 PADDING) | |
| Byte3 | | Header + Data 0 | Header 0 |
| Byte4 | | Header + Data 1 (if exist) | Header 1 (if exist) |
| Byte5 | | Header + Data 2 (if exist) | Header 2 (if exist) |
| Byte6 | | Header + Data 3 (if exist) | Header 3 (if exist) |
| Byte7 | | Header + Data 4 (if exist) | |
| Byte8 | | Header + Data 5 (if exist) | |
| Byte9 | | Header + Data 6 (if exist) | |
| : | | : | |
| Byte20 | | Header + Data 17 (if exist) | |
| Byte21 | | Header + Data 18 (if exist) | |
| Byte22 | | Header + Data 19 (if exist) | |

F I G. 1 3

| | | | | |
|---|---|---|---|---|
| Byte0 | bit7 | Don't care (0 PADDING) | | |
| | bit6 | COMMAND TYPE | | |
| | | 0x0 | DIRECT COMMAND | |
| | | 0x1 | ADDRESS-SKIP COMMAND | |
| | | [DIRECT COMMAND] | | [ADDRESS-SKIP COMMAND] |
| | bit5 | I2C RW | | |
| | | 0x0 | I2C Write | |
| | | 0x1 | I2C Read | |
| | | [I2C Write] | [I2C Read] | [I2C Write] | [I2C Read] |
| | bit4:0 | Data Length (0~16Byte) | | |
| Byte1 | bit7:5 | Header Length (0~4Byte) | | |
| | bit4 | Count 0: Count ABSENT / 1: Count PRESENT | | |
| | bit3 | CRC 0: CRC ABSENT / 1: CRC PRESENT | | |
| | bit2 | Don't care (0 PADDING) | | |
| | bit1:0 | Controller (0~3) | | |
| Byte2 | bit7:1 | Slave Address | | |
| | bit0 | Don't care (0 PADDING) | | |
| Byte3 | | Header + Data 0 | Header 0 | Header + Data 0 | Header 0 |
| Byte4 | | Header + Data 1 (if exist) | Header 1 (if exist) | Header + Data 1 (if exist) | Header 1 (if exist) |
| Byte5 | | Header + Data 2 (if exist) | Header 2 (if exist) | Header + Data 2 (if exist) | Header 2 (if exist) |
| Byte6 | | Header + Data 3 (if exist) | Header 3 (if exist) | Header + Data 3 (if exist) | Header 3 (if exist) |
| Byte7 | | Header + Data 4 (if exist) | | Header + Data 4 (if exist) | |
| Byte8 | | Header + Data 5 (if exist) | | Header + Data 5 (if exist) | |
| Byte9 | | Header + Data 6 (if exist) | | Header + Data 6 (if exist) | |
| … | | | | | |
| Byte20 | | Header + Data 17 (if exist) | | Header + Data 7 (if exist) | |
| Byte21 | | Header + Data 18 (if exist) | | Header + Data 8 (if exist) | |
| Byte22 | | Header + Data 19 (if exist) | | Header + Data 19 (if exist) | |

F I G. 14

| COMMAND NUMBER | CONVENTIONAL METHOD | | | EMBODIMENTS | | |
|---|---|---|---|---|---|---|
| | COMMAND TYPE | A. ADDRESS INFORMATION<br>B. REGISTER ADDRESS LENGTH INFORMATION<br>F. INFORMATION RELATING TO PRESENCE/ABSENCE OF CRC OR PRESENCE/ABSENCE<br>TOTAL SIZE [Byte] | C. REGISTER ADDRESS INFORMATION<br>D. DATA LENGTH INFORMATION<br>E. DATA INFORMATION<br>G. READ OR WRITE<br>TOTAL SIZE [Byte] | COMMAND TYPE | A. ADDRESS INFORMATION<br>B. REGISTER ADDRESS LENGTH INFORMATION<br>F. INFORMATION RELATING TO PRESENCE/ABSENCE OF CRC OR PRESENCE/ABSENCE<br>TOTAL SIZE [Byte] | C. REGISTER ADDRESS INFORMATION<br>D. DATA LENGTH INFORMATION<br>E. DATA INFORMATION<br>G. READ OR WRITE<br>TOTAL SIZE INCLUDING COMMAND TYPE [Byte] |
| 0 | DIRECT | 2 | 3 | DIRECT | 2 | 3 |
| 1 | DIRECT | 2 | 3 | ADDRESS-SKIP | 0 | 3 |
| 2 | DIRECT | 2 | 3 | ADDRESS-SKIP | 0 | 3 |
| ... | ... | ... | ... | ... | ... | ... |
| 199 | DIRECT | 2 | 3 | ADDRESS-SKIP | 0 | 3 |
| SUBTOTAL | – | 400 | 600 | – | 2 | 600 |
| TOTAL | – | 1000 | | – | 602 | |

FIG. 15

PARALLEL PROCESSING DEVICE, METHOD FOR CONTROLLING PARALLEL PROCESSING DEVICE, AND CONTROLLER USED IN PARALLEL PROCESSING DEVICE

CROSS-REFERENCE TO RELATED APPLICATION

This application is based upon and claims the benefit of priority of the prior Japanese Patent Application No. 2016-176360, filed on Sep. 9, 2016, the entire contents of which are incorporated herein by reference.

FIELD

The embodiments discussed herein are related to a parallel processing device, a method for controlling the parallel processing device, and a controller used in the parallel processing device.

BACKGROUND

In general, in a computer system such as a high-performance computing (HPC) model, a plurality of nodes are equipped in a rack or the like. Each of the plurality of nodes is a processing unit that is operated by one operating system (OS), and is configured such that components such as a processor and a memory are mounted on one board (hereinafter referred to as a system board (SB)). In such a large-scale computer system configured by a plurality of nodes, high-density mounting is attempted in order to reduce an installation area cost. Due to high-density mounting, the number of components that configure one system has increased, and the number of components to be controlled for system operation has also increased. Similarly, in order to meet the needs of performance, an amount of information that is set in each component such as a central processing unit (CPU) or a memory has increased, and control has also become complicated. Therefore, a load on a system controller that operates or controls the system (hereinafter referred to as a service processor (SP)) has increased, and a throughput and a processing time for, for example, starting (reset) of system, collecting logs at the time of hardware errors or periodically monitoring a state have increased. An increase in a system control time results in the inhibition of a simple operation of a computer, and a system control method with a small system control load is requested.

As a conventional technology for realizing the efficient control of a processing device even when the number of components mounted onto each of the boards that configure the processing device increases due to high-density mounting, the following technology is known. A controller in each of the boards sequentially reads one processing procedure from a storage that stores a series of processing procedures to be executed on each of the boards, in response to an execution instruction from a management unit. The controller sequentially executes a process according to the read processing procedure on each of the boards so as to control a plurality of components (nodes), and reports a result of executing the series of processing procedures to the management unit (for example, Japanese Laid-open Patent Publication No. 2012-230597).

In the conventional technology above, after the management unit collectively writes a series of processing procedures to the storage, and the controller sequentially reads one processing procedure from the storage and causes a component (a node) to execute the processing procedure. Therefore, the management unit can reduce overhead of the controller in calling a device driver. However, in this conventional technology, when a series of processing procedures are transmitted to a controller side on which the storage exists, it is requested that "information that changes only at a low frequency in continuous processing procedures, such as a destination, an address length, or the presence/absence of a cyclic redundancy check (CRC) code" be reported in duplicate.

SUMMARY

According to an aspect of the present invention, a parallel processing device includes: a management unit; a plurality of nodes; and a controller that controls each of the plurality of nodes in accordance with a first command transmitted from the management unit. The controller includes: a command storage that stores a second command generated a previous time; a command type identification unit that identifies a command type of the first command transmitted from the management unit; and a command generator that generates a third command by using the second command according to the command type.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 3A and 3B are diagrams in which a command format of each command that is written as a command list from an SP to a buffer in a control circuit according to the second embodiment is compared with a command format in a conventional technology.

FIGS. 4A and 4B are diagrams in which an amount of communication in a case in which a command list is written from an SP to a buffer in a control circuit is compared between the conventional technology and the second embodiment.

FIG. 6 is a flowchart illustrating an example of reception command generation/execution processing performed by a control circuit according to the second embodiment.

FIG. 8 illustrates an example of a second command format of each command that is written as a command list from an SP to a buffer in a control circuit according to the third embodiment.

FIG. 11 is a flowchart illustrating an example of transmission command generation processing performed by an SP according to the third embodiment.

FIG. 12 is a flowchart illustrating an example of reception command generation/execution processing performed by a control circuit according to the third embodiment.

FIG. 13 illustrates an example of a command format in a conventional device.

FIG. 14 illustrates an example of a command format according to the second embodiment.

FIG. 15 is a diagram in which the size of a transmitted command is compared between a conventional device and the embodiments.

DESCRIPTION OF EMBODIMENTS

Figure 1:
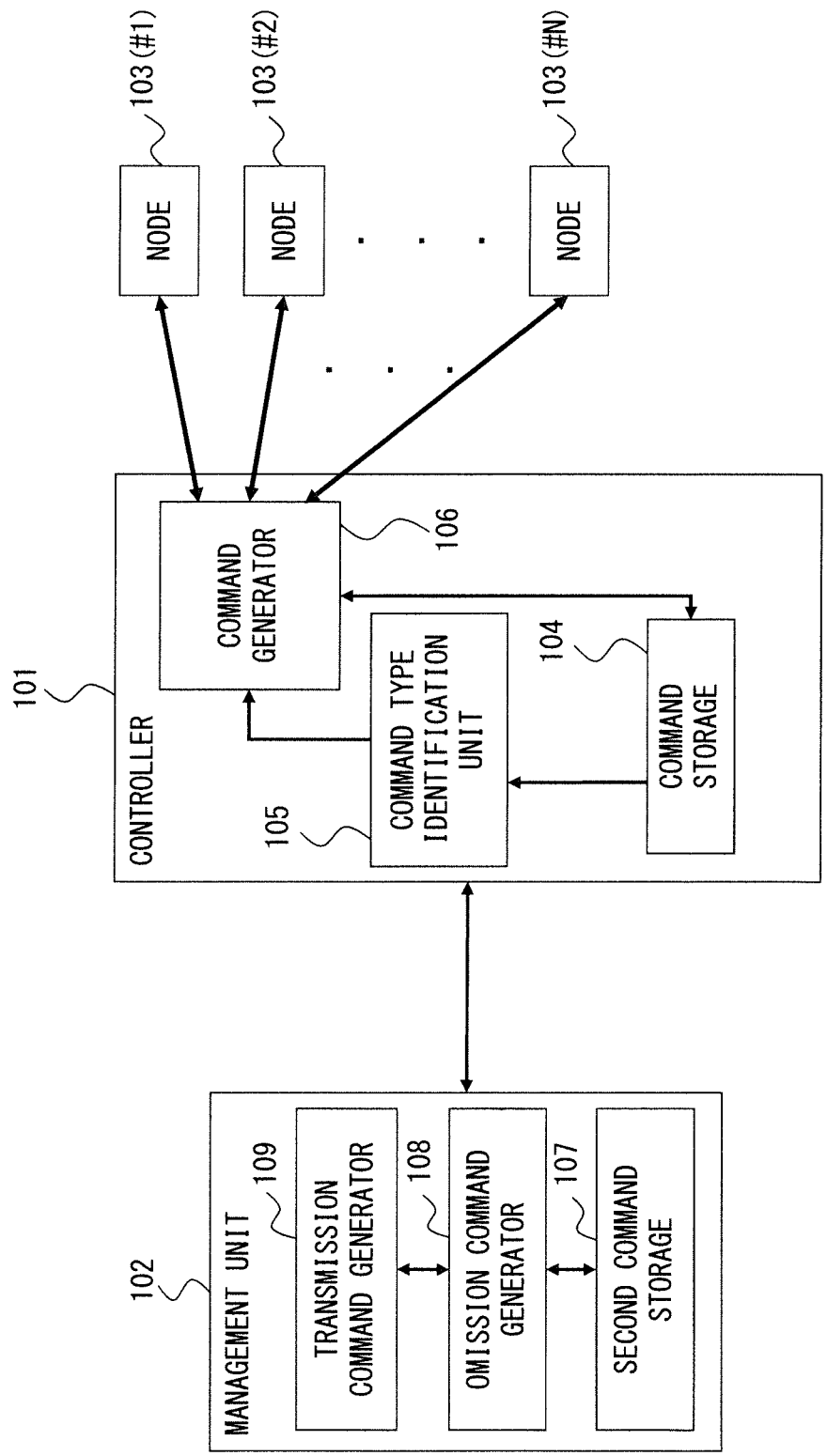
FIG. 1 is a block diagram according to a first embodiment.

Embodiments of the invention are described below with reference to the drawings. FIG. 1 is a block diagram of a parallel processing device according to a first embodiment.

The parallel processing device according to the first embodiment is a device that identifies a command type of each command and generates a command using information relating to a stored command. The parallel processing device according to the first embodiment includes a management unit 102, a plurality of nodes (N nodes) 103, #1 to #N, and a controller 101 that controls each of the plurality of nodes 103 in accordance with a first command transmitted from the management unit 102. Each of the nodes 103, #1 to #N, is a component that includes a processor, a memory, an input/output interface, and the like, and that has a function of performing parallel processing in accordance with a parallel architecture.

The controller 101 includes a command storage 104, a command type identification unit 105, and a command generator 106. Note that the controller 101 may be implemented by a processor system that includes a processor element and a memory. The processor element can execute a software program stored in the memory. Alternatively, the controller 101 may be implemented by a signal processing circuit such as FPGA.

The command storage 104 stores a second command generated previously by the controller 101.

The command type identification unit 105 identifies a command type of a first command transmitted from the management unit 102.

The command generator 106 generates a third command by using the second command stored in the command storage 104 in accordance with the command type identified by the command type identification unit 105. More specifically, the command generator 106 generates the third command by interpolating control information that has been omitted from a command transmitted from the management unit 102 by using control information in the second command generated previously that has been stored in the command storage 104. Examples of the control information include information that changes every time in continuous commands, such as data, and information that changes only at a low frequency in continuous commands, such as a destination, an address length, or the presence/absence of a CRC code, for example, information for which a value sometimes does not change in comparison with the command generated previously. The interpolated control information is information for which a value does not change in comparison with the second command generated previously. Here, interpolation is a process for restoring deleted control information and generating an original command.

The management unit 102 includes a command storage 107 (hereinafter referred to as a second command storage), an omission command generator 108, and a transmission command generator 109.

The second command storage 107 stores a fourth command, which is a command before processing of a previously transmitted command.

The omission command generator 108 generates an omission command in transmitting a command. The omission command is a command obtained by omitting specified control information from the command in accordance with the fourth command stored in the second command storage 107.

The transmission command generator 109 generates a transmission command obtained by adding information indicating the form of omission performed by the omission command generator 108 as a command type to the omission command, and transmits the transmission command to the controller 101. The form of omission is, for example, a form indicating whether one specified piece, two specified pieces, or three specified pieces of control information have been omitted.

In this case, the omission command generator 108 in the management unit 102 compares a command with a previous fourth command that has been stored in the second command storage 107, and omits specified control information from the command in accordance with a specified command format. Meanwhile, the command generator 106 in the controller 101 generates the third command by interpolating, for example, specified omitted control information by using the second command generated previously that has been stored in the command storage 104, according to the specified command format. In addition, the command type identification unit 105 in the controller 101 grasps the form of omission by identifying a command type that is added to the first command transmitted from the management unit 102. In the configuration above, when the controller 101 receives the first command in an omission type from the management unit 102, the controller 101 can perform a process reversible to an omission process in the management unit 102, and can restore an original command that was a target to be transmitted in the management unit 102.

By employing the configuration above, in the first embodiment, a command transmitted from the management unit 102 to the controller 101 has a form of an omission command in which the same field of control information as the field in a previous command has been omitted, for example. Therefore, in communication of a command from the management unit 102 to the controller 101, a duplicate report is prevented from being generated, and an amount of communication between the management unit 102 and the controller 101 can be reduced.

Figure 2:
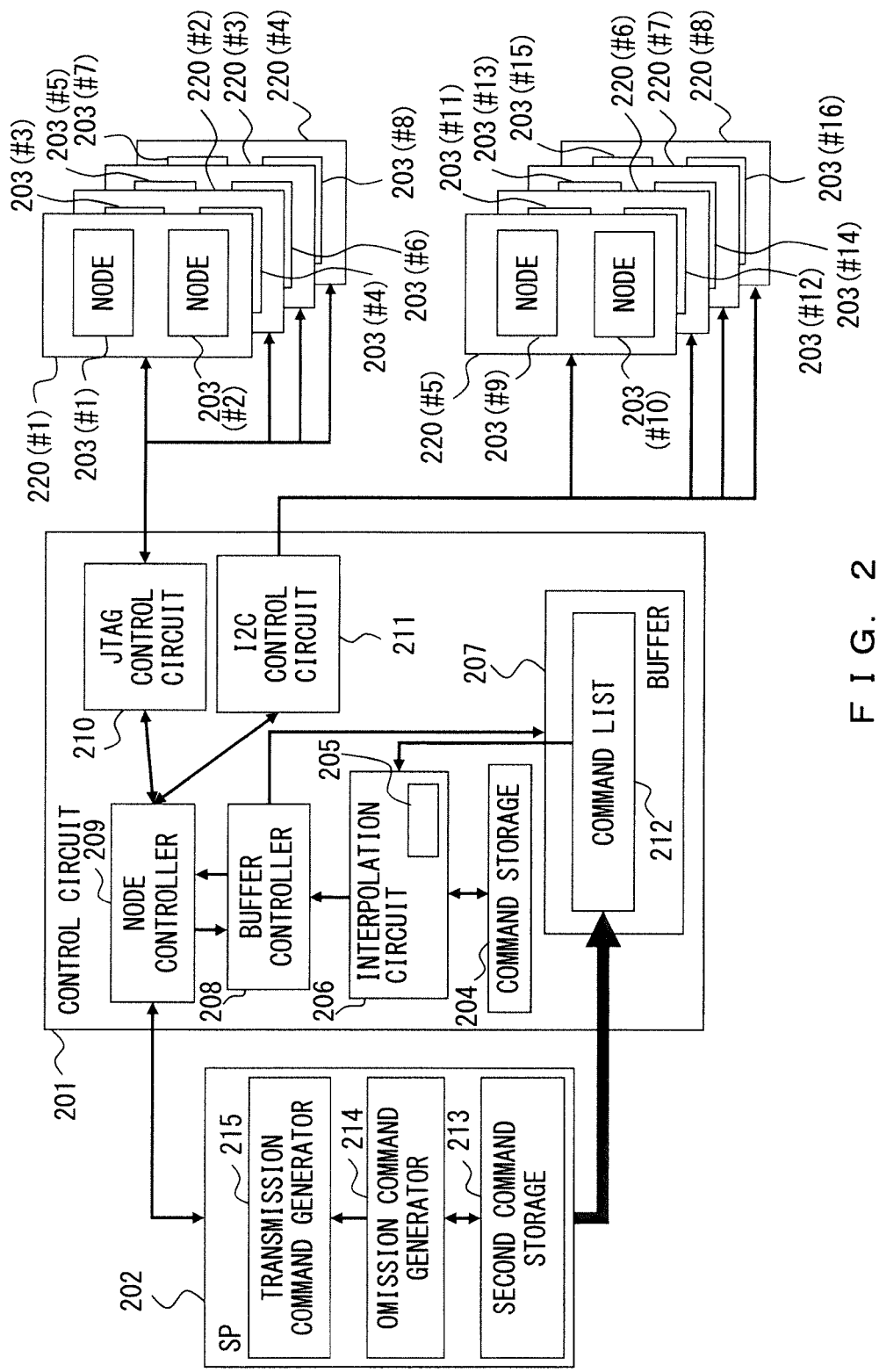
FIG. 2 is a block diagram according to a second embodiment.

FIG. 2 is a block diagram of a parallel processing device according to a second embodiment. The parallel processing device according to the second embodiment is a device that performs interpolation in a case in which four command types exist as an omission form. The parallel processing device according to the second embodiment includes a control circuit 201, a service processor (hereinafter referred to as an "SP") 202, and sixteen nodes 203, #1 to #16, that respectively have functions similar to those of the controller 101, the management unit 102, and the nodes 103 according to the first embodiment in FIG. 1.

The control circuit 201 includes an interpolation circuit 206 including a command storage 204 and a command type identification unit 205, a buffer 207 that stores a command list 212, a buffer controller 208, a node controller 209, a JTAG control circuit 210, and I2C control circuit 211. These processing blocks in the control circuit 201 are implemented by field programmable gate arrays (FPGAs).

The buffer 207 stores a series of commands transmitted from the SP 202 to the control circuit 201, as the command list 212.

The buffer controller 208 issues, to the buffer 207, an instruction to sequentially read the series of commands from the command list 212 in response to an execution instruction from the SP 202 that is input via the node controller 209 described later.

The command storage 204 has a function similar to that of the command storage 104 according to the first embodiment in FIG. 1, and stores a command that has been previously generated by the interpolation circuit 206.

The command type identification unit 205 in the interpolation circuit 206 has a function similar to that of the command type identification unit 105 according to the first embodiment in FIG. 1. The command type identification unit 205 identifies command types of commands in the command list 212 that are sequentially read from the buffer 207 in response to an instruction of the buffer controller 208.

The interpolation circuit 206 performs the following operation according to the command type identified by the command type identification unit 205. The interpolation circuit 206 generates a command by interpolating control information omitted from the command that has been read in response to the instruction of the buffer controller 208, by using control information in a command that has previously been generated by the interpolation circuit 206 itself and has been stored in the command storage 204. The interpolation circuit 206 outputs the generated command to the buffer controller 208.

The node controller 209 issues an instruction to perform a process according to the command that has been generated by the interpolation circuit 206 and has been input to the buffer controller 208, to any of the nodes 203, #1 to #16, via the JTAG control circuit 210 or the I2C control circuit 211 described later. The node controller 209 also reports a result of executing the command in the node 203 to the SP 202.

The JTAG control circuit 210 is an interface circuit that controls a joint test action group (JTAG) control interface scheme. JTAG is a control interface scheme that has been standardized as 1149.1 by the Institute of Electrical and Electronics Engineers, Inc. (IEEE), which is an international conference in the electrical and electronic engineering technology. JTAG provides a scheme for performing communication with a processor (not illustrated) in a node 203 (in the example of FIG. 2, each of the nodes 203, #1 to #8) by using serial communication. The JTAG control circuit 210 performs communication with each of the nodes 203, #1 to #8, for example, by using four signals, TCK (clock), TDI, (data input), TDO (data output), and TMS (state control).

The I2C control circuit 211 is an interface circuit that controls the intel-integrated circuit (I-squared-C; I2C) control interface scheme. I2C is a control interface scheme for serial communication developed by Philips of the Netherlands. I2C provides a scheme for performing communication with a processor (not illustrated) in a node 203 (in the example of FIG. 2, each of the nodes 203, #9 to #16) by using serial communication. The I2C control circuit 211 implements one-to-many communication with each of the nodes 203, #9 to #16, for example, by using two bidirectional open-collector signal lines that have been pulled up by a resistance.

The node controller 209 specifies a node 203 that is a control target to be controlled by a command from among the nodes #1 to #16 in accordance with a command that is sequentially input from the buffer controller 208. The node controller 209 selects the JTAG control circuit 210 when the specified node 203 to be controlled is any of the nodes 203, #1 to #8, and selects the I2C control circuit 211 when the specified node 203 is any of the nodes 203, #9 to #16. The node controller 209 issues an instruction to execute the command to the node 203 to be controlled via the selected JTAG control circuit 210 or I2C control circuit 211.

The SP 202 corresponds to the management unit 102 according to the first embodiment in FIG. 1. The SP 202 includes a second command storage 213, an omission command generator 214, and a transmission command generator 215 that respectively perform operations similar to those of the second command storage 107, the omission command generator 108, and the transmission command generator 109 in FIG. 1. These processing blocks in the SP 202 are, for example, processes in which a central processing unit (CPU) that is not particularly illustrated in the SP 202 executes a transmission command generation processing program stored in a memory that is not particularly illustrated.

In the second embodiment, as illustrated in FIG. 2, for example, pairs of two nodes, #1 and #2, #3 and #4, #5 and #6, #7 and #8, #9 and #10, #11 and #12, #13 and #14, and #15 and #16 are respectively mounted onto boards 220, #1 to #8.

FIGS. 3A and 3B are diagrams in which a command format of each of the commands that are written as the command list 212 from the SP 202 to the buffer 207 in the control circuit 201 according to the second embodiment of FIG. 2 is compared with a command format in a conventional technology. FIG. 3A illustrates a command format in the conventional technology, and FIG. 3B illustrates command formats according to the second embodiment.

First, as illustrated in FIG. 3A or FIG. 3B, a command is divided into a plurality of control information fields.

"A. Information that changes every time in continuous commands, such as data"

"B1. Information 1 that changes only at a low frequency in continuous commands, such as a destination, an address length, or the presence/absence of CRC"

"B2. Information 2 that changes only at a low frequency in continuous commands, such as a destination, an address length, or the presence/absence of CRC"

"BX. Information X that changes only at a low frequency in continuous commands, such as a destination, an address length, or the presence/absence of CRC"

By using the command format in the conventional technology illustrated in FIG. 3A, all of the control information fields above, A., B1., B2., . . . BX., are transmitted from the SP 202 to the buffer 207 in the control circuit 201, every time a command is transmitted.

In contrast, according to the second embodiment, by using the command formats illustrated in FIG. 3B, the SP 202 of FIG. 2 performs the following processing on each of the commands in the command list 212 that will be transmitted to the control circuit 201.

The operation of the omission command generator 214 in the SP 202 of FIG. 2 is described first.

First, the omission command generator 214 compares each command to be transmitted with an original command that is a command before processing of a previously transmitted command, the original command being stored in the second command storage 213, in accordance with the command formats of FIG. 3B, so as to determine which of the control information fields above is coincident.

As a result of the comparison above, when the command to be transmitted and the previous command match each other in a control information field after B2. (B3. (not-illustrated)) to the control information field BX., the omission command generator 214 performs the following process. The omission command generator 214 outputs an omission command that has a form in which the control information fields B3. to BX. have been omitted from the command to be transmitted, as illustrated as [address-skip command 1-1] in FIG. 3B. Namely, the address-skip command refers to a specific form of the omission command, and also refers to a command obtained by skipping (omitting) an address as control information.

As a result of the comparison above, when the command to be transmitted and the previous command match each other in the control information fields B2. to BX., the omission command generator 214 performs the following process. The omission command generator 214 outputs an omission command that has a form in which the control information fields B2. to BX. have been omitted from the command to be transmitted, as illustrated as [address-skip command 1-2] in FIG. 3B.

As a result of the comparison above, when the command to be transmitted and the previous command match each other in the control information fields B1. to BX., the omission command generator 214 performs the following process. The omission command generator 214 outputs an omission command that has a form in which the control information fields B1. to BX. have been omitted from the command to be transmitted, as illustrated as [address-skip command 1-3] in FIG. 3B.

As a result of the comparison above, in a case other than the above three cases (hereinafter referred to as a "normal time"), the omission command generator 214 performs the following process. Similarly to the conventional example of FIG. 3A, the omission command generator 214 outputs an omission command that has a form in which no control information fields have been omitted from the command to be transmitted, as illustrated as [direct command 1] in FIG. 3B (this is also referred to as an "omission command" for convenience).

The operation of the transmission command generator 215 in the SP 202 is described next. The transmission command generator 215 performs the following processing according to the command formats of FIG. 3B.

When the omission command generator 214 outputs the omission command above that has an omission form illustrated as [direct command 1] in FIG. 3B, the transmission command generator 215 performs the following processing. The transmission command generator 215 generates a command obtained by adding the command type value "0x0" ("0×" at the beginning indicates that a value that follows is a hexadecimal number) indicating the direct command 1 in the first two bits indicated as bit[0:1] in FIG. 3B. The transmission command generator 215 further adds the content of the command that has been generated by the omission command generator 214 and that is indicated as [direct command 1] in FIG. 3B in the third bit and the subsequent bits of the command. The transmission command generator 215 stores the generated "command type+[direct command 1]" as one transmission command that configures a command list 212 to be transmitted. Namely, the transmission command refers to a command obtained by adding an omission command to a command type value added at the beginning.

When the omission command generator 214 outputs the omission command above that has an omission form indicated as [address-skip command 1-1] in FIG. 3B, the transmission command generator 215 performs the following processing. The transmission command generator 215 generates a command obtained by adding the command type value "0x1" indicating the address-skip command 1-1 in the first two bits indicated as bit[0:1] in FIG. 3B. The transmission command generator 215 further adds the content of the command that has been generated by the omission command generator 214 and that is indicated as [address-skip command 1-1] in FIG. 3B in the third bit and the subsequent bits of the command. The transmission command generator 215 stores the generated "command type+[address-skip command 1-1]" as one transmission command that configures the command list 212 to be transmitted.

When the omission command generator 214 outputs the omission command above that has an omission form indicated as [address-skip command 1-2] in FIG. 3B, the transmission command generator 215 performs the following processing. The transmission command generator 215 generates a command obtained by adding the command type value "0x2" indicating the address-skip command 1-2 in the first two bits indicated as bit[0:1] in FIG. 3B. The transmission command generator 215 further adds the content of the command that has been generated by the omission command generator 214 and that is indicated as [address-skip command 1-2] in FIG. 3B in the third bit and the subsequent bits of the command. The transmission command generator 215 stores the generated "command type+[address-skip command 1-2]" as one transmission command that configures the command list 212 to be transmitted.

When the omission command generator 214 outputs the omission command above that has an omission form indicated as [address-skip command 1-3] in FIG. 3B, the transmission command generator 215 performs the following processing. The transmission command generator 215 generates a command obtained by adding the command type value "0x3" indicating the address-skip command 1-3 in the first two bits indicated as bit[0:1] in FIG. 3B. The transmission command generator 215 further adds the content of the command that has been generated by the omission command generator 214 and that is indicated as [address-skip command 1-3] in FIG. 3B in the third bit and the subsequent bits. The transmission command generator 215 stores the generated "command type+[address-skip command 1-3]" as one transmission command that configures the command list 212 to be transmitted.

When the omission command generator 214 and the transmission command generator 215 completes the omission command generation processing and the transmission command generation processing described above on all of the commands to be transmitted, the omission command generator 214 and the transmission command generator 215 perform the following processing. The transmission command generator 215 writes all of the stored transmission commands as the command list 212 to the buffer 207 by performing one call for a device driver to the buffer 207 in the control circuit 201.

The operation of the control circuit 201 of FIG. 2 is described next. By using the command formats according to the second embodiment illustrated in FIG. 3B, the control circuit 201 performs the following processing on each of the commands in the command list 212 that are read from the buffer 207 in response to an instruction of the buffer controller 208.

First, the command type identification unit 205 in the interpolation circuit 206 identifies a value that has been set in the first two bits indicated as bit[0:1] in FIG. 3B of a command read from the buffer 207.

As a result of this identification, when the command type identification unit 205 determines that the command type value "0x0" has been set in the first two bits of the command, the interpolation circuit 206 performs the following processing. As described above with reference to FIG. 3B, this command is a direct command 1 in which no control information fields have been omitted, and therefore the interpolation circuit 206 outputs the input command with no change to the buffer controller 208.

When the command type identification unit 205 determines that the command type value "0x1" has been set in the first two bits of the command, the interpolation circuit 206 performs the following processing. As described above with reference to FIG. 3B, this command is an address-skip command 1-1 in which the control information fields B3. to BX. have been omitted. Therefore, the interpolation circuit 206 generates a command by interpolating the control information fields B3. to BX. of a previously generated command that has been stored in the command storage 204 into the input command, and the interpolation circuit 206 outputs the generated command to the buffer controller 208.

When the command type identification unit 205 determines that the command type value "0x2" has been set in the first two bits of the command, the interpolation circuit 206 performs the following processing. As described above with reference to FIG. 3B, this command is an address-skip command 1-2 in which the control information fields B2. to BX. have been omitted. Therefore, the interpolation circuit 206 generates a command by interpolating the control information fields B2. to BX. of the previously generated command that has been stored in the command storage 204 into the input command, and the interpolation circuit 206 outputs the generated command to the buffer controller 208.

When the command type identification unit 205 determines that the command type value "0x3" has been set in the first two bits of the command, the interpolation circuit 206 performs the following processing. As described above with reference to FIG. 3B, this command is an address-skip command 1-3 in which the control information fields B1. to BX. have been omitted. Therefore, the interpolation circuit 206 generates a command by interpolating the control information fields B1. to BX. of the previously generated command that has been stored in the command storage 204 into the input command, and the interpolation circuit 206 outputs the generated command to the buffer controller 208.

The command type identification unit 205 and the interpolation circuit 206 perform the processing above on all of the commands in the command list 212 that have been read from the buffer 207 in response to an instruction from the buffer controller 208, and output each of the generated commands to the buffer controller 208.

As described above, when the control circuit 201 receives a command of an omission form from the SP 202 via the buffer 207, the control circuit 201 can perform the processing reversible to the omission processing in the SP 202, and can restore an original command that was a target to be transmitted in the SP 202.

FIGS. 4A and 4B are diagrams in which a communication amount in a case in which a command list 212 that is configured by a series of commands such as Command0 to Command15 is written from the SP 202 to the buffer 207 in the control circuit 201 is compared between the conventional technology and the second embodiment. FIG. 4A illustrates a case in the conventional technology, and FIG. 4B illustrates a case according to the second embodiment. In the conventional technology, control information is not omitted from each of the commands, and therefore, as illustrated in FIG. 4A, for example, all of the commands need, for example, a data amount of 8 bytes, and the total communication amount is, for example, 128 bytes. In contrast, according to the second embodiment, the same control information field as the field in a previous command is omitted, and therefore the total communication amount is, for example, 76 bytes, as illustrated in the example of the command list 212 in FIG. 4B, for example.

In this case, first, the buffer controller 208 sets a reading pointer at the head address of the command list 212 in the buffer 207. The buffer controller 208 reads a command type value of two bits from the head address, and reports the command type value to the command type identification unit 105. The command type identification unit 105 can grasp which omission command in FIG. 3B follows the command type value by identifying the command type value in these two bits, and therefore the command type identification unit 105 can determine the byte length of the omission command. The command type identification unit 105 reports information relating to this byte length to the buffer controller 208. The buffer controller 208 reads an omission command having the reported byte length while updating the address of the reading pointer by +1 from a current address (an address of the second bit of the command type value), and transfers the omission command to the interpolation circuit 206.

Then, the buffer controller 208 sets the reading pointer at an address next to the address at which the omission command having the byte length above have been read, in the command list 212 in the buffer 207. The buffer controller 208 reads a command type value of two bits including the address of the reading pointer, and reports the command type value to the command type identification unit 105. The command type identification unit 105 can grasp which omission command in FIG. 3B follows the command type value by identifying this command type value of two bits, and therefore the command type identification unit 105 can determines the byte length of the omission command. The command type identification unit 105 reports information relating to this byte length to the buffer controller 208. The buffer controller 208 reads an omission command having the reported byte length while updating the address of the reading pointer by +1 from a current address (the address of the second bit of the command type value), and transfers the omission command to the interpolation circuit 206.

By repeating the control operation above, even when a command list 212 having a variable length form in FIG. 4B is employed, each of the commands in the command list 212 in the buffer 207 can be sequentially read.

By doing this, in the second embodiment, similarly to the case according to the first embodiment, a duplicate report is prevented from being generated in writing the command list 212 from the SP 202 to the buffer 207 in the control circuit 201, and an amount of communication between the SP 202 and the control circuit 201 can be reduced.

Figure 5:
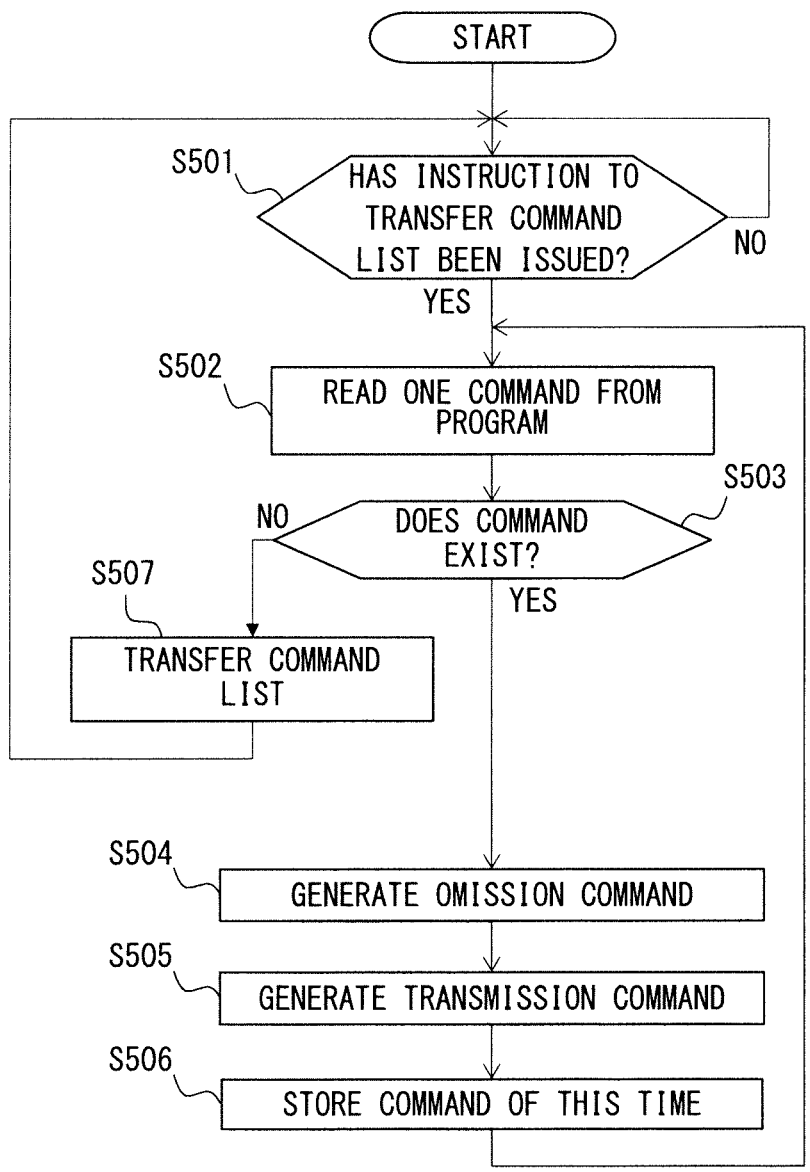
FIG. 5 is a flowchart illustrating an example of transmission command generation processing performed by an SP according to the second embodiment.

FIG. 5 is a flowchart illustrating an example of transmission command generation processing performed by the SP 202. This processing is, for example, processing in which a CPU (not particularly illustrated) in the SP 202 executes a command generation processing program stored in a memory (not particularly illustrated).

First, the SP 202 waits until an instruction to transfer a command list to the control circuit 201 is issued in the SP 202 (the determination result in step S501 repeatedly becomes NO).

When the transfer instruction is issued (the determination result in step S501 becomes YES), the SP 202 reads one command from a program executed inside (step S502).

The SP 202 determines whether the command has been successfully read (step S503).

When the determination result in step S503 is YES, the SP 202 performs an omission command generation process that corresponds to the omission command generator 214 in FIG. 2 that has been described above with reference to FIG. 3B (step S504). By doing this, an omission command generated by omitting control information in the form described with reference to FIG. 3B is generated according to a result of comparing the command read in step S502 with a command before processing of a previously transmitted command that has been stored in a storage area of the memory in the SP 202.

The SP 202 performs an transmission command generation process that corresponds to the transmission command generator 215 in FIG. 2 that has described above with reference to FIG. 3B (step S505). As a result, a command type value that corresponds to an omission form of the omission command generated in step S504 is added in the first two bits, and a transmission command in which the omission command has been added in the third bit and the subsequent bits is generated. The SP 202 stores the generated transmission command as a portion of a command list 212 (see FIG. 2) to be transmitted in the memory in the SP 202.

The SP 202 stores the command read in step S502 as a command before processing of a previously transmitted command in the storage area of the memory in the SP 202 (step S506).

The processing of the SP 202 returns to the process of step S502, and the next command in the command list is processed.

As a result of repeating the operation above, when the determination result in step S503 becomes NO such that it is determined that there are no commands that have not been processed, the following process is performed. The SP 202 transfers a group of commands that have been stored in the storage area of the memory in the SP 202 in the process of step S505 as the command list 212 (FIG. 2) to the buffer 207 in the control circuit 201 (step S507). Then, the processing of the SP 202 returns to the waiting process of step S501.

FIG. 6 is a flowchart illustrating an example of reception command generation/execution processing performed by the control circuit 201. This processing indicates a series of execution operations of FPGAs that configure the control circuit 201 of FIG. 2 in the form of a flowchart.

First, an FPGA block that corresponds to the node controller 209 of FIG. 2 waits until an instruction to execute the command list 212 transferred from the SP 202 to the buffer 207 is received (the determination result in step S601 repeatedly becomes NO).

When the determination result in step S601 becomes YES, control shifts from an FPGA block that corresponds to the node controller 209 of FIG. 2 to an FPGA block that corresponds to the buffer controller 208 of FIG. 2. The FPGA block that corresponds to the buffer controller 208 issues an instruction to read one command from the command list 212, to the buffer 207 that is configured in a memory incorporated in the control circuit 201 (step S602).

As a result, the FPGA block that corresponds to the buffer controller 208 determines whether a command has been read from a memory that corresponds to the buffer 207 (step S603).

When the determination result in step S603 is YES, control shifts from the FPGA block that corresponds to the buffer controller 208 of FIG. 2 to an FPGA block that corresponds to the interpolation circuit 206 of FIG. 2. An FPGA block that corresponds to the command type identification unit 205 in the interpolation circuit 206 of FIG. 2 performs a command type determination process that corresponds to the operation of the command type identification unit 205 of FIG. 2 that has been described above with reference to FIG. 3B (step S604). In this process, a command type is identified from the first two bits of the command read in step S602.

Then, the FPGA block that corresponds to the interpolation circuit 206 of FIG. 2 performs a command interpolation process that corresponds to the operation of the interpolation circuit 206 of FIG. 2 that has been described above with reference to FIG. 3B (step S605). In this process, as described above, a command is generated by interpolating the control information described above with reference to FIG. 3B in accordance with a result of comparing the command read in step S602 with a previously generated command that has been stored in the memory in the control circuit 201. The generated command is output to the FPGA block that corresponds to the buffer controller 208 of FIG. 2.

The FPGA block that corresponds to the interpolation circuit 206 of FIG. 2 stores the command generated as a result of the interpolation process in step S605 as a previously generated command in the storage area of the memory in the control circuit 201 (step S606).

Control shifts from the FPGA block that corresponds to the interpolation circuit 206 of FIG. 2 to FPGA blocks that respectively correspond to the buffer controller 208 and the node controller 209 in FIG. 2. The FPGA block that corresponds to the buffer controller 208 transfers, to the node controller 209, the command that has been input from the FPGA block that corresponds to the interpolation circuit 206. The node controller 209 performs an existing execution process on this command (step S607). Details of this process are omitted, but the outline of this process is described below. First, the FPGA block of the node controller 209 specifies a node 203 on which the command will be executed, and identifies an FPGA block of a control circuit connected to the specified node 203 from among the JTAG control circuit 210 and the I2C control circuit 211.

The FPGA block of the node controller 209 issues the command to the specified node 203 via the identified FPGA block of the control circuit. The FPGA block of the node controller 209 waits for a command execution result from the specified node 203 via the FPGA block of the control circuit, and returns requested response data to the SP 202.

After the FPGA block of the node controller 209 performs the process of step S607, control returns to the process of step S602 performed by the FPGA block of the buffer controller 208. Consequently, the reception processing and the execution processing are repeatedly performed on the next command in the command list 212 stored in the buffer 207.

Figure 7:
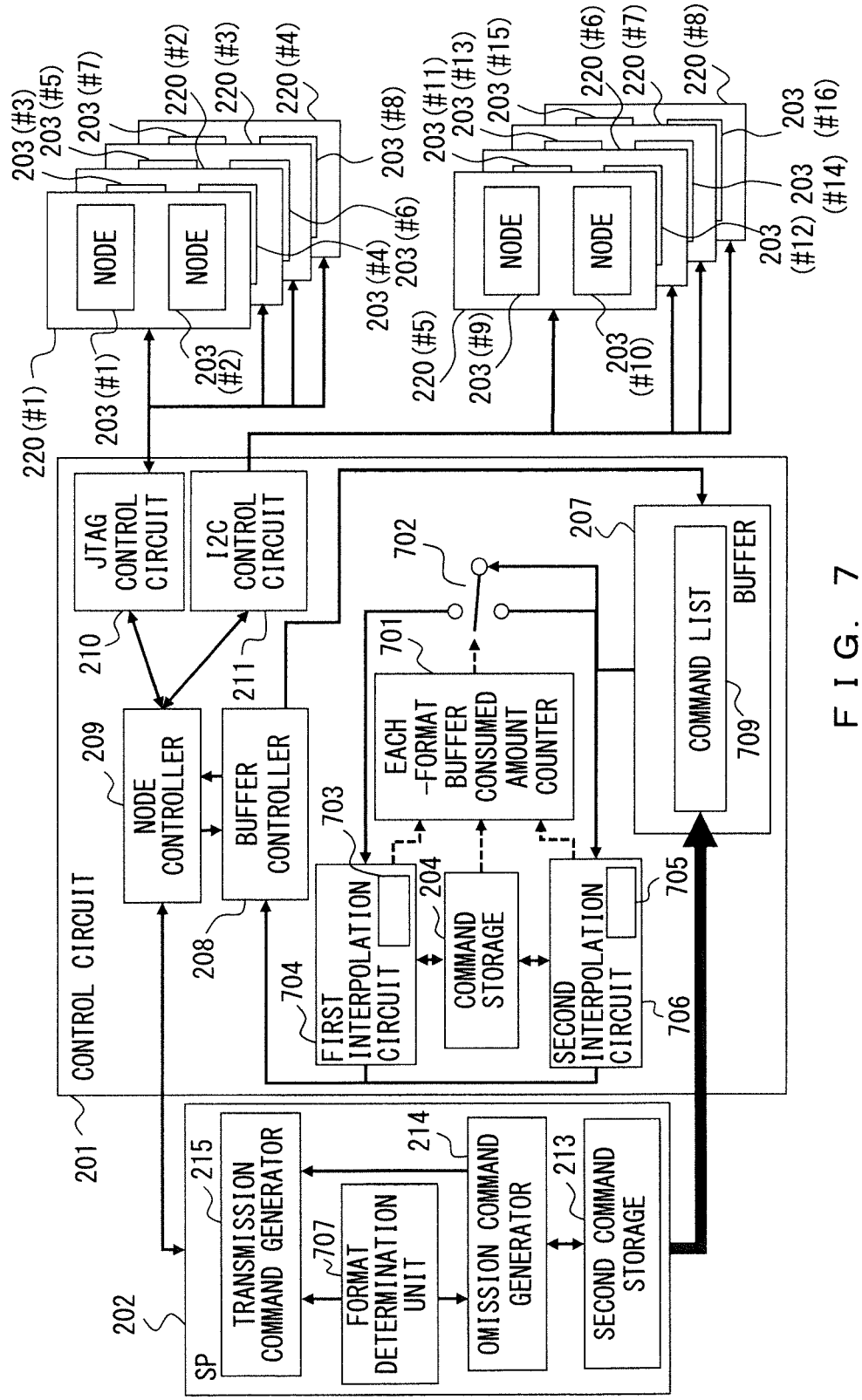
FIG. 7 is a block diagram of a parallel processing device according to a third embodiment.

FIG. 7 is a block diagram of a parallel processing device according to a third embodiment. The parallel processing device according to the third embodiment is a device that includes a process for comparing a communication size of a previous command and a calculated command size and selecting a command format that corresponds to a smaller one. In the third embodiment, it is assumed that a component denoted by the same number as the number in the case of FIG. 2 according to the second embodiment performs the same operation as the operation in the case according to the second embodiment.

First, in FIG. 7, the configuration of each of sixteen nodes 203, #1 to #16, each two of which are mounted onto each of eight boards 220, #1 to #8, is similar to the configuration in the case of FIG. 2 according to the second embodiment.

The configuration of a control circuit 201 in FIG. 7 according to the third embodiment is described next.

In the control circuit 201 of FIG. 7, a command storage 204, a buffer 207, a node controller 209, a JTAG control circuit 210, and an I2C control circuit 211 that are implemented by FPGAs are similar to those in the case of FIG. 2 according to the second embodiment.

Differences between the control circuit 201 of FIG. 7 and the case of FIG. 2 according to the second embodiment are an each-format buffer consumed amount counter 701, a selector 702, a first command type identification unit 703, a first interpolation circuit 704, a second command type identification unit 705, and a second interpolation circuit 706. These are substituted for the command type identification unit 205 and the interpolation circuit 206 of FIG. 2 according to the second embodiment. In addition, the configuration of a command list 709 stored in the buffer 207 is different from the configuration of the command list 212 of FIG. 2 according to the second embodiment.

The each-format buffer consumed amount counter 701 (a size-per-format calculator) performs the following processing on a series of commands that are generated as a result of interpolation performed by the first interpolation circuit 704 or the second interpolation circuit 706 and that are sequentially stored in the command storage 204.

The each-format buffer consumed amount counter 701 calculates each transmission amount under the assumption that a series of commands generated this time and the previous times are sequentially transmitted from the SP 202 to the buffer 207 in the control circuit 201 in each of the first and second command formats described later. The each-format buffer consumed amount counter 701 calculates a size in each of the first and second command formats in accordance with each of the transmission amounts.

The format selector 702 selects either the first command format or the second command format according to the respective sizes calculated by the each-format buffer consumed amount counter 701 by using a specified algorithm. The specified algorithm is, for example, "a command format that corresponds to the smaller size is selected".

The format selector 702 performs the following operation, when the buffer controller 208 issues an instruction to read a command list 709 that will be written to the buffer 207 next time. When the format selector 702 previously selected the first command format, the format selector 702 inputs, into the first interpolation circuit 704, each of the commands in the next command list 709 read from the buffer 207. When the format selector 702 previously selected the second command format, the format selector 702 inputs, into the second interpolation circuit 706, each of the commands in the next command list 709 read from the buffer 207.

The first interpolation circuit 704 and the first command type identification unit 703 operate when the format selector 702 selects the first command format, as described above.

The first command type identification unit 703 in the first interpolation circuit 704 identifies the command types of commands in the command list 709 that are sequentially read from the buffer 207 in response to the instruction from the buffer controller 208, in accordance with the first command format. The operation of the first command type identification unit 703 is similar to the operation of the command type identification unit 205 of FIG. 2 according to the embodiment, except that a command format is fixed to the first command format.

The first interpolation circuit 704 performs the following operation according to the command type identified by the first command type identification unit 703. The first interpolation circuit 704 generates a command by interpolating control information that has been omitted from the command read according to an instruction from the buffer controller 208, by using control information in a previously generated command that has been stored in the command storage 204. The first interpolation circuit 704 outputs the generated command to the buffer controller 208. The operation of the first interpolation circuit 704 is similar to the operation of the interpolation circuit 206 of FIG. 2 according to the embodiment, except that a command format is fixed to the first command format.

The second interpolation circuit 706 and the second command type identification unit 705 operate when the format selector 702 selects the first command format. The operations of the second command type identification unit 705 and the second interpolation circuit 706 are similar to the operations of the first command type identification unit 703 and the first interpolation circuit 704, except that a command format is changed to the second command format.

The operations of the node controller 209, the JTAG control circuit 210, and the I2C control circuit 211 are similar to the operations in FIG. 2 according to the second embodiment. The node controller 209 specifies a node 203 to be controlled by a command from among nodes #1 to #16 in accordance with commands that are sequentially input from the buffer controller 208. The node controller 209 selects the JTAG control circuit 210 when the specified node 203 to be controlled is any one of nodes 203, #1 to #8, and selects the I2C control circuit 211 when the specified node 203 to be controlled is any one of nodes 203, #9 to #16. The node controller 209 issues an instruction to execute a command to the node 203 to be controlled via the selected JTAG control circuit 210 or I2C control circuit 211.

In the configuration above, the operations of the each-format buffer consumed amount counter 701 and the format selector 702 are summarized as below.

> When "a size under the assumption that a series of commands generated this time and the previous times are transmitted from the SP 202 to the buffer 207 in the control circuit 201 in accordance with the first command format<a size under the assumption that the series of commands generated this time and the previous times are transmitted from the SP 202 to the buffer 207 in the control circuit 201 in accordance with the second command format", the format selector 702 selects the first command type identification unit 703 and the first interpolation circuit 704 that operate according to the first command format (1)

> When "a size under the assumption that a series of commands generated this time and the previous times are transmitted from the SP 202 to the buffer 207 in the control circuit 201 in accordance with the first command format a size under the assumption that the series of commands generated this time and the previous times are transmitted from the SP 202 to the buffer 207 in the control circuit 201 in accordance with the second command format", the format selector 702 selects the second command type identification unit 705 and the second interpolation circuit 706 that operate according to the second command format (2)

Here, the each-format buffer consumed amount counter 701 may calculate a size that corresponds to the first command format, as described below. The each-format buffer consumed amount counter 701 multiplies a transmission amount according to the first command format that is calculated for a series of commands generated each of plural times that include this time and the previous times by a specified forgetting factor that corresponds to each of the plural times so as to calculate a multiplication result for each of the plural times. The each-format buffer consumed amount counter 701 calculates an addition result obtained by summing the multiplication results calculated for the respective plural times, as a size that corresponds to the first command format. Assume that a transmission amount according to the first command format that is calculated for a series of commands generated this time is $S_{10}$, and that a specified forgetting factor that corresponds to this time is 1. Also assume that a transmission amount according to the first command format that is calculated for a series of commands generated one time before is $S_{11}$, and that a specified forgetting factor that corresponds to one time before is $\alpha$. Further assume that a transmission amount according to the first command format that is calculated for a series of commands generated two times before is $S_{12}$, and that a specified forgetting factor that corresponds to two times before is $\alpha^2$. When it is assumed that a size to be calculated this time that corresponds to the first command format is $SIZE_1$, $SIZE_1$ is calculated according to the expression below.

$$SIZE_1 = S_{10} + S_{11} \times \alpha + S_{12} \times \alpha^2 \quad (3)$$

Similarly, the each-format buffer consumed amount counter 701 may calculate a size that corresponds to the second command format, as described below. The each-format buffer consumed amount counter 701 multiplies a transmission amount according to the second command format that is calculated for a series of commands generated each of plural times that include this time and the previous times by a specified forgetting factor that corresponds to each of the plural times so as to calculate a multiplication result for each of the plural times. The each-format buffer consumed amount counter 701 calculates an addition result obtained by summing the multiplication results calculated for the respective plural times, as a size that corresponds to the second command format. Assume that a transmission amount according to the second command format that is calculated for a series of commands generated this time is $S_{20}$, and that a specified forgetting factor that corresponds to this time is 1. Also assume that a transmission amount according to the second command format that is calculated for a series of commands generated one time before is $S_{21}$, and that a specified forgetting factor that corresponds to one time before is $\alpha$. Further assume that a transmission amount according to the second command format that is calculated for a series of commands generated two times before is $S_{22}$, and that a specified forgetting factor that corresponds to two times before is $\alpha^2$. When it is assumed that a size to be calculated this time that corresponds to the second command format is $SIZE_2$, $SIZE_2$ is calculated according to the expression below.

$$SIZE_2 = S_{20} + S_{21} \times \alpha + S_{22} \times \alpha^2 \quad (4)$$

When the each-format buffer consumed amount counter 701 operates according to expression (3) and expression (4) described above, the format selector 702 operates according to the specified algorithm expressed by the expressions below.

When $SIZE_1 < SIZE_2$,
the format selector 702 operates according to the first command format, and the format selector 702 selects the first command type identification unit 703 and the first interpolation circuit 704 (5)

When $SIZE_1 \geq SIZE_2$,
the format selector 702 operates according to the second command format, and the format selector 702 selects the second command type identification unit 705 and the second interpolation circuit 706 (6)

The configuration of the SP 202 of FIG. 7 according to the third embodiment is described next.

In the SP 202, the second command storage 213 is similar to the case according to the second embodiment in FIG. 2. Further, the omission command generator 214 and the transmission command generator 215, which are software processing units in the SP 202, are similar to the case according to the second embodiment in FIG. 2.

In contrast, the SP 202 of FIG. 7 is different from the case according to the second embodiment in FIG. 2, and the SP 202 of FIG. 7 further includes a format determination unit 707. The format determination unit 707 performs the following processing on a series of commands of this time and the previous times on which transmission processing has not been performed by the omission command generator 214 and the transmission command generator 215. The format determination unit 707 calculates a transmission amount under the assumption that the series of commands of this time and the previous times before transmission processing are sequentially transmitted from the SP 202 to the buffer 207 in the control circuit 201 according to each of the first and second command formats. The omission command generator 214 calculates a size according to each of the first and second command formats in accordance with each of the transmission amounts.

The format determination unit 707 determines either the first command format or the second command format in accordance with the respective calculated sizes by using the same specified algorithm as the algorithm of the format selector 702 in the control circuit 201.

The omission command generator 214 performs processing similar to the processing according to the second embodiment in FIG. 2 on a series of commands before transmission processing that correspond to the next command list 709 in accordance with the command format determined by the format determination unit 707. Consequently, the omission command generator 214 generates a series of omission commands obtained by omitting specified control information from each of the series of commands in accordance with a command stored in the second command storage 213.

The transmission command generator 215 in the SP 202 generates a series of transmission commands obtained by adding information indicating the omission form as a command type to each of the series of omission commands in accordance with the command format determined by the format determination unit 707. The transmission command generator 109 writes the series of transmission commands as a new command list 709 to the buffer 207 by performing one call for a device driver to the buffer 207 in the control circuit 201.

In the configuration above, the operation of the format determination unit 707 is summarized as below.

When "a size under the assumption that a series of commands before transmission processing of this time and the previous times are transmitted from the SP 202 to the buffer 207 in the control circuit 201 in accordance with the first command format<a size under the assumption that the series of commands before transmission processing of this time and the previous times are transmitted from the SP 202 to the buffer 207 in the control circuit 201 in accordance with the second command format", the format determination unit 707 selects the first command format (7)

When "a size under the assumption that a series of commands before transmission processing of this time and the previous times are transmitted from the SP 202 to the buffer 207 in the control circuit 201 in accordance with the first command format≥a size under the assumption that the series of commands before transmission processing of this time and the previous times are transmitted from the SP 202 to the buffer 207 in the control circuit 201 in accordance with the second command format", the format determination unit 707 selects the second command format (8)

Here, the format determination unit 707 may calculate a size that corresponds to the first command format, as described below. The format determination unit 707 multiplies a transmission amount according to the first command format that is calculated for a series of commands before transmission processing of each of plural times including this time and the previous times by a specified forgetting factor that corresponds to each of the plural times so as to calculate a multiplication result for each of the plural times. The each-format buffer consumed amount counter 701 calculates an addition result obtained by summing multiplication results calculated for the respective plural times as a size that corresponds to the first command format. Assume that a transmission amount according to the first command format that is calculated for a series of commands before transmission processing of this time is $s_{10}$, and that a specified forgetting factor that corresponds to this time is 1. Also assume that a transmission amount according to the first command format that is calculated for a series of commands before transmission processing of one time before is $s_{11}$, and that a specified forgetting factor that corresponds to one time before is $\alpha$. Further assume that a transmission amount according to the first command format that is calculated for a series of commands before transmission processing of two times before is $s_{12}$, and that a specified forgetting factor that corresponds to two times before is $\alpha^2$. When it is assumed that a size to be calculated this time that corresponds to the first command format is $size_1$, $size_1$ is calculated according to the expression below.

$$size_1 = s_{10} + s_{11} \times \alpha + s_{12} \times \alpha^2 \quad (9)$$

Similarly, the each-format buffer consumed amount counter 701 may calculate a size that corresponds to the second command format, as described below. The each-format buffer consumed amount counter 701 multiplies a transmission amount according to the second command format that is calculated for a series of commands before transmission processing of each of plural times including this time and the previous times by a specified forgetting factor that corresponds to each of the plural times so as to calculate a multiplication result for each of the plural times. The each-format buffer consumed amount counter 701 calculates an addition result obtained by summing multiplication results calculated for the respective plural times as a size that corresponds to the second command format. Assume that a transmission amount according to the second command format that is calculated for a series of commands before transmission processing of this time is $s_{20}$, and that a specified forgetting factor that corresponds to this time is 1. Also assume that a transmission amount according to the second command format that is calculated for a series of commands before transmission processing of one time before is $S21$ and that a specified forgetting factor that corresponds to one time before is $\alpha$. Further assume that a transmission amount according to the second command format that is calculated for a series of commands before transmission processing of two times before is $s_{22}$, and that a specified forgetting factor that corresponds to two times before is $\alpha^2$. When it is assumed that a size to be calculated this time that corresponds to the second command format is $size_2$, $size_2$ is calculated according to the expression below.

$$size_2 = s_{20} + S_{21} \times \alpha + s_{22} \times \alpha^2 \quad (10)$$

When the format determination unit 707 operates according to expression (9) and expression (10) described above, the format determination unit 707 operates according to a specified algorithm expressed by the expressions below.

When $size_1 < size_2$, the format determination unit 707 selects the first command format (11)

When $size_1 \geq size_2$, the format determination unit 707 selects the second command format (12)

When comparing the operation of the format determination unit 707 in the SP 202 according to expression (7) to expression (12) described above with the operations of the each-format buffer consumed amount counter 701 and the format selector 702 in the control circuit 201 according to expression (1) to expression (6) described above, the following can be seen.

First, the operations according to expression (1) and expression (2) of the each-format buffer consumed amount counter 701 and the format selector 702 in the control circuit 201 are identical to the operation according to expression (7) and expression (8) of the format determination unit 707 in the SP 202. Namely, a command format is selected according to the same determination logic.

More specifically, in expression (9) and expression (10), $s_{10}$ is a transmission amount under the assumption that transmission commands are generated according to the first command format for a series of commands before transmission processing of this time in the SP 202. In expression (3) and expression (4), $S_{10}$ is a transmission amount under the assumption that transmission commands are generated according to the first command format on a side of the SP 202, for a series of commands that are generated by the control circuit 201 this time. Accordingly, the above two transmission amounts $s_{10}$ and $S_{10}$ have the same value. For the same reason as this, each two transmission amounts, $s_{11}$ and $S_{11}$ or $s_{12}$ and $S_{12}$, have the same value. Further, each two transmission amounts, $s_{20}$ and $S_{20}$, $s_{21}$ and $S_{21}$, or $s_{22}$ and $S_{22}$, have the same value.

Accordingly, the size $SIZE_1$ to be calculated this time that corresponds to the first command format, the size $SIZE_1$ being calculated by the control circuit 201 according to expression (3), and the size $size_1$ to be calculated this time that corresponds to the first command format, the size $size_1$ being calculated by the SP 202 according to expression (9), have the same value. Similarly, the size $SIZE_2$ to be calculated this time that corresponds to the second command format, the size $SIZE_2$ being calculated by the control circuit 201 according to expression (4), and the size $size_2$ to be calculated this time that corresponds to the second command format, the size $size_2$ being calculated by the SP 202 according to expression (10), have the same value. Therefore, in each communication of the command list 709, a command format selected on a side of the control circuit 201 according to expression (5) and expression (6) is the same as a command format selected on a side of the SP 202 according to expression (11) and expression (12). Namely, the format determination unit 707 in the SP 202 and the each-format buffer consumed amount counter 701 and the format selector 702 in the control circuit 201 perform the same process for selecting a command format according to the same specified algorithm.

As described above, in the third embodiment with the configuration of FIG. 7, the following is implemented. When the command list 709 is transmitted from the SP 202 to the control circuit 201, the first command format of FIG. 3B and the second command format of FIG. 8 can be dynamically changed in such a way that the size of the command list 709 is minimized. In this case, each of the SP 202 and the control circuit 201 can synchronize and switch command formats in such a way that the size of a command list 709 to be transmitted is minimized, with no need to include information for switching command formats in the command list 709.

Details of a command format and an exemplary operation according to the third embodiment in FIG. 7 are described below.

In the third embodiment illustrated in FIG. 7, with respect to a command format of each of the commands that are written as the command list 212 from the SP 202 to the buffer 207 in the control circuit 201, the first command format is similar to the command format above of FIG. 3B.

In addition, in the third embodiment, the second command format illustrated in FIG. 8 is selectively used. The second command format of FIG. 8 is divided into plural control information fields, A. and B1. to BX., similarly to the case of the first command format of FIG. 3B.

Figure 9:
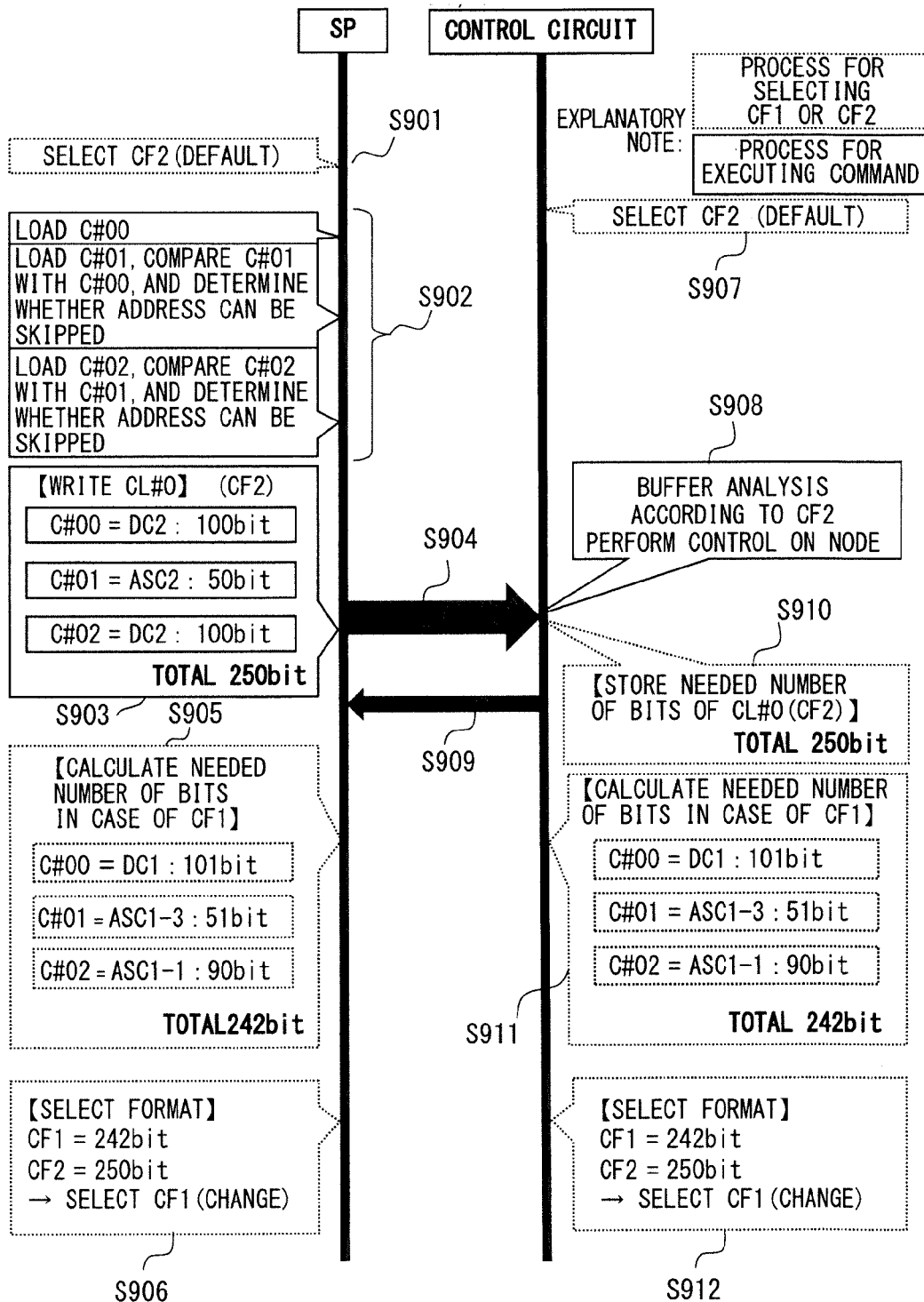
FIG. 9 is a sequence diagram (no. 1) illustrating an example of an operation according to the third embodiment.
Figure 10:
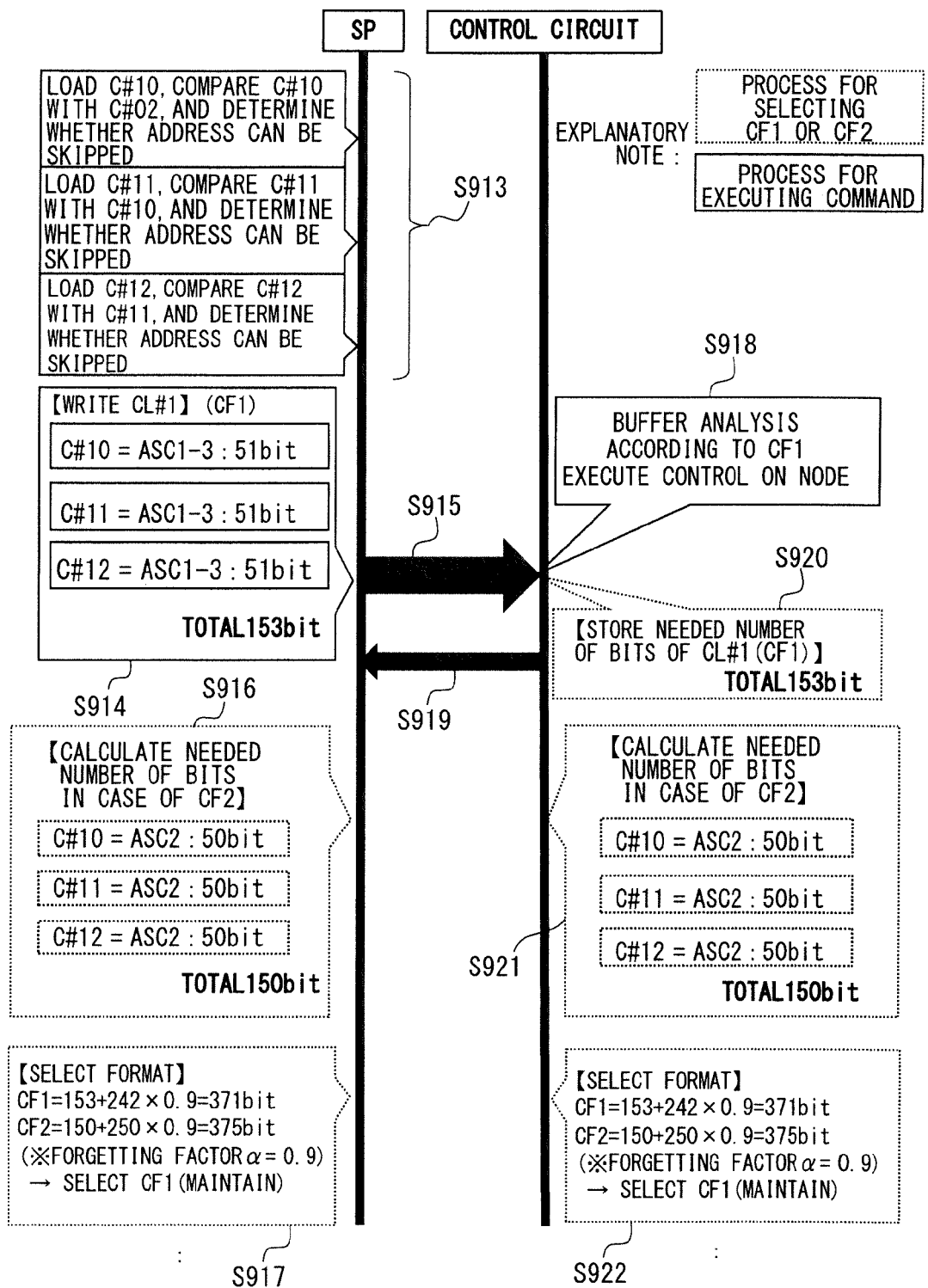
FIG. 10 is a sequence diagram (no. 2) illustrating an example of an operation according to the third embodiment.

According to the third embodiment, in the SP 202 and the control circuit 201 of FIG. 7, the processing described below is performed by using two command formats, the first command format illustrated in FIG. 3B and the second command format illustrated in FIG. 8. An example of the operations of the SP 202 and the control circuit 201 is described below with reference to the sequence diagrams of FIG. 9 and FIG. 10 illustrating an example of an operation according to the third embodiment. In FIG. 9 and FIG. 10, "CF" indicates a command format, and CF1 and CF2 respectively indicate the first command format and the second command format. "C#ij" (i and j are 0 or a natural number) indicates the j+1-th command in the i+1-th command list 709. As an example, in S902 of FIG. 9, all of C#00, C#01, and C#02 indicate commands in the first command list 709 (i+1=1) because i=0. In addition, C#00 indicates the first command (j+1=1) because j=0, C#01 indicates the second command (j+1=2) because j=1, and C#02 indicates the third command (j+1=3) because j=2. As another example, in S913 of FIG. 10, all of C#10, C#11, and C#12 indicate commands in the second command list 709 (i+1=2), because i=1. "DC1", "ASC1-1", and "ASC1-3" respectively indicate a direct command 1, an address-skip command 1-1, and an address-skip command 1-3 according to the first command format of FIG. 3B. "ASC2" indicates an address-skip command 2 according to the second command format of FIG. 8. CL#i indicates the i+1-th command list 709. As an example, in S903 of FIG. 9, CL#0 indicates the first command list 709 (i+1=1), because i=0. As another example, in S914 of FIG. 10, CL#1 indicates the second command list 709 (i+1=2), because i=1.

The operation of the SP 202 of FIG. 7 is described first.

First, when the first command list 709 is transmitted, the omission command generator 214 in the SP 202 selects, for example, the second command format (CF2) illustrated in FIG. 8 as a default command format in a process for generating an omission command (S901 in FIG. 9).

In FIG. 7, the omission command generator 214 performs an operation similar to the operation in the case of the omission command generator 214 according to the second embodiment in FIG. 2, in accordance with the second command format (CF2). The omission command generator 214 compares a command to be transmitted with an original command that is a command before processing of a previously transmitted command and that has been stored in the second command storage 213, in accordance with the second command format (CF2), so as to determine which control information field the commands match each other in. As illustrated in FIG. 8, control information according to the second command format (CF2) is any of A., B1., B2., . . . , BX., similarly to the control information of FIG. 3B described above according to the second embodiment that corresponds to the first command format (CF1).

As a result of the comparison above according to the second command format (CF2), in the first case in which the command to be transmitted matches the previous command in the control information B1. to the control information BX., the omission command generator 214 performs the following process. The omission command generator 214 outputs a command that has a form in which the control information B1. to the control information BX. have been omitted from the command to be transmitted, as illustrated as [address-skip command 2] in FIG. 8.

As a result of the comparison above according to the second command format (CF2), in the second case other than the first case, the omission command generator 214 performs the following process. The omission command generator 214 outputs a command that has a form in which no control information fields have been omitted from the command to be transmitted, as illustrated as [direct command 2] in FIG. 8, similarly to the case of the conventional example illustrated in FIG. 3A.

In the example of S902 in FIG. 9 that is performed by the omission command generator 214, the first command C#00 for the first command list 709 (=CL#0) is first loaded onto a memory (not particularly illustrated) in the SP 202 via a program executed by the SP 202. Originally, no commands have been stored in the second command storage 213. Therefore, the "direct command 2" (DC2) is determined as an omission command for C#00 in accordance with the second command format (CF2) of FIG. 8. C#00 is stored in the second command storage 213.

Then, the second command C#01 for the first command list 709 (=CL#0) is loaded. This C#01 is compared with C#00, which has been stored in the second command storage 213, in accordance with the second command format (CF2) of FIG. 8, so as to determine whether an address can be skipped. Assume, for example, that the commands match each other in the control information B1. to the control information BX. in FIG. 8. In this case, addresses relating to these fields of control information can be skipped in C#01, and the "address-skip command 2" (ASC2) of FIG. 8 is determined as an omission command. C#01 is stored in the second command storage 213.

Further, the third command C#02 for the first command list 709 (=CL#0) is loaded. This C#02 is compared with C#01, which has been stored in the second command storage 213, in accordance with the second command format (CF2) of FIG. 8, so as to determine whether an address can be skipped. Assume, for example, that the commands does not match each other in one of the control information B1. to the control information BX. of FIG. 8. In this case, the "direct command 2" (DC2) of FIG. 8 is determined as an omission command for C#02. C#02 is stored in the second command storage 213.

After the operation of the omission command generator 214 that corresponds to the first command list 709 above (=CL#0), the transmission command generator 215 in the SP 202 performs the following operation according to the second command format of FIG. 8.

When the omission command generator 214 outputs the omission command above that has the omission form illustrated as [direct command 2] in FIG. 8, the transmission command generator 215 performs the following process. The transmission command generator 215 generates a command obtained by adding the command type value "0x0" indicating the direct command 2 in the first bit illustrated as bit[0] in FIG. 8. The transmission command generator 215 further adds the content of the command illustrated as [direct command 2] in FIG. 8 that has been generated by the omission command generator 214, in the second bit and the subsequent bits of this command. The transmission command generator 215 stores the generated "command type+ [direct command 2]" as one transmission command that configures the command list 709.

When the omission command generator 214 outputs the omission command above that has the omission form illustrated as [address-skip command 2] in FIG. 8, the transmission command generator 215 performs the following process. The transmission command generator 215 generates a command obtained by adding the command type value "0x1" indicating the address-skip command 2 in the first bit illustrated as bit[0] in FIG. 8. The transmission command generator 707 further adds the content of the command illustrated as [address-skip command 2] in FIG. 8 that has been generated by the omission command generator 214, in the second bit and the subsequent bits of this command. The transmission command generator 215 stores the generated "command type+[address-skip command 2]" as one transmission command that configures the command list 709.

In the example of FIG. 9, assume that the first command list 709 (=CL#0) is determined by respective omission commands that correspond to the three commands C#00, C#01, and C#02. In this case, the content of CL#0 is, for example, the content illustrated in S903 of FIG. 9. First, an omission command of C#00 is the direct command 2 (DC2), and is a command of 100 bits in total in which the command type value "0x0" indicating DC2 has been set in the first bit (bit[0] in FIG. 8). In addition, an omission command of C#01 is the address-skip command 2 (ASC2), and is a command of 50 bits in total in which the command type value "0x1" indicating ASC2 has been set in the first bit (bit[0] in FIG. 8). Further, an omission command of C#02 is the direct command 2 (DC2), and is a command of 100 bits in total in which the command type value "0x0" indicating DC2 has been set in the first bit (bit[0] in FIG. 8).

When the omission command generation processing of the omission command generator 214 and the transmission command generation processing of the transmission command generator 215 have been completed on all of the commands to be transmitted, the transmission command generator 215 performs the following process. The transmission command generator 215 writes all of the stored transmission commands as the command list 709 to the buffer 207 by performing one call for a device driver to the buffer 207 in the control circuit 201.

In the example of FIG. 9, the first command list 709 (=CL#0) that has been generated according to the second command format (CF2), as illustrated in S903, is transferred from a memory (not particularly illustrated) in the SP 202 to the buffer 207 in the control circuit 201 (S904 in FIG. 9).

After transmitting the first command list 709, as described above, the format determination unit 707 performs the following processing on a series of commands before the first transmission processing.

First, the format determination unit 707 calculates a transmission amount that corresponds to the second command format (CF2) of FIG. 8 at the time when the first command list 709 is transmitted. In the example of S903 in FIG. 9, a transmission amount of the first command list 709 (=CL#0) that corresponds to the three commands C#00, C#01, and C#02, is 250 bits (=100+50+100). Accordingly, a transmission amount that corresponds to the second command format (CF2) at the time when the first command list 709 is transmitted is calculated as 250 bits. The format determination unit 707 calculates the size $size_2$ at the time when the first command list 709 is sequentially transmitted to the control circuit 201 according to the second command format (CF2), in accordance with the calculated transmission amount by using expression (10) described above. In expression (10), the transmission amount $s_{20}$ according to the second command format (CF2) that is calculated for a series of commands before this transmission processing is 250 bits, which is calculated in S903 of FIG. 9 described above. The first command list 709 is transmitted this time, and therefore both the transmission amount $s_{21}$ of one time before and the transmission amount $s_{22}$ of two times before according to the second command format (CF2) are 0. Assume, for example, that $\alpha=0.9$. In this case, the transmission amount $size_2$ that corresponds to the second command format (CF2) of FIG. 8 at the time when the first command list 709 of this time is transmitted is calculated as below by using expression (10).

$$size_2 = s_{20} + s_{21} \times \alpha + s_{22} \times \alpha^2 = 250 + 0 \times 0.9 + 0 \times 0.9^2 = 250 \text{ bits} \qquad (13)$$

Then, the format determination unit 707 calculates a transmission amount under the assumption that a series of commands before transmission processing are sequentially transmitted to the control circuit 201 according to the first command format (CF1) of FIG. 3B. Specifically, the format determination unit 707 causes the omission command generator 214 and the transmission command generator 215 to perform operations again on a series of commands before transmission processing, C#00, C#01, and C#02, in accordance with the first command format (CF1) of FIG. 3B. In this case, the transmission command generator 215 performs only a process for calculating a transmission amount without performing an actual transmission process. Consequently, as illustrated in S905 of FIG. 9, for example, first, an omission command of C#00 becomes the direct command 2 (DC1) of FIG. 3B, the command type value "0x0" indicating DC1 is set in the first two bits (bit[0:1] in FIG. 3B), and a command of 101 bits in total is generated. In addition, an omission command of C#01 becomes the address-skip command 1-3 (ASC1-3) of FIG. 3B, the command type value "0x3" indicating ASC1-3 is set in the first two bits (bit[0:1] in FIG. 3B), and a command of 51 bits in total is generated. Further, an omission command of C#02 becomes the address-skip command 1-1 (ASC1-1) of FIG. 3B, the command type value "0x1" indicating ASC1-1 is set in the first two bits (bit[0:1] in FIG. 3B), and a command of 90 bits in total is generated. As a result of the processing above, in the example of S905 in FIG. 9, a transmission amount of a series of commands that correspond to the three commands C#00, C#01, and CO2# that have been processed according to the first command format (CF1) is calculated as 242 bits (=101+ 51+90). The format determination unit 707 calculates the size $size_1$ under the assumption that the first command list 709 is sequentially transmitted to the control circuit 201 according to the first command format (CF1), in accordance the calculated transmission amount by using expression (9) described above. In expression (9), the transmission amount $s_{10}$ according to the first command format (CF1) that is calculated for a series of commands before processing of this time is 242 bits, which is calculated in S905 of FIG. 9 described above. The first command list 709 is transmitted this time, and therefore both the transmission amount $s_{21}$ of one time before and the transmission amount $s_{22}$ of two times before according to the first command format (CF1) are 0. Assume, for example, that $\alpha=0.9$. In this case, the transmission amount $size_1$ that corresponds to the first command format (CF1) of FIG. 3B under the assumption that the first command list 709 of this time is transmitted is calculated as below according to expression (9).

$$size_1 = s_{10} + s_{11} \times \alpha + s_{12} \times \alpha^2 \quad (14)$$
$$= 242 + 0 \times 0.9 + 0 \times 0.9^2$$
$$= 242 \text{ bits}$$

After the calculation processing above, the format determination unit 707 selects a command format that corresponds to the smaller one of the size $size_1$ that corresponds to the first command format (CF1) and the size $size_2$ that corresponds to the second command format (CF2). According to expression (13) and expression (14) described above, the size $size_1$ that corresponds to CF1 is 242 bits, and the size $size_2$ that corresponds to CF2 is 250 bits, as illustrated in S906 of FIG. 9. Therefore, the format determination unit 707 selects the first command format (CF1) according to the determination logic of expression (11) described above. Consequently, the command format is changed from the second command format (CF2) to the first command format (CF1).

An operation at the time when the second command list 709 (=CL#1) is transmitted is described next.

In this case, the omission command generator 214 performs a process for generating an omission command according to the first command format (CF1), which has been determined by the format determination unit 707 at the time of transmitting the first command list 709 (=CL#0) (S906 in FIG. 9→S913 in FIG. 10). This process is as described above with reference to FIG. 3B in the description of the second embodiment.

By doing this, in the process of S913 in FIG. 10 performed by the omission command generator 214, the first command C#10 for the second command list 709 (=CL#1) is loaded onto a memory (not particularly illustrated) in the SP 202 via a program executed by the SP 202. This C#10 is compared with C#10 that has been stored in the second command storage 213 in the previous process, in accordance with the first command format (CF1) of FIG. 3B so as to determine whether an address can be skipped. Assume, for example, that the commands match each other in the control information B1. to the control information BX. of FIG. 3B. In this case, addresses relating to these control information fields can be skipped in C#10, and the "address-skip command 1-3" (ASC1-3) is determined as an omission command. C#10 is stored in the second command storage 213.

Then, the second command C#01 for the second command list 709 (=CL#1) is loaded. This C#01 is compared with C#10, which has been stored in the second command storage 213, in accordance with the first command format (CF1) of FIG. 3B so as to determine whether an address can be skipped. Assume, for example, that the commands match each other in the control information B1. to the control information BX. of FIG. 8. In this case, addresses relating to these control information fields can also be skipped in C#01, and the "address-skip command 1-3" (ASC1-3) is determined as an omission command. C#11 is stored in the second command storage 213.

Further, the third command C#12 for the second command list 709 (=CL#1) is loaded. This C#12 is compared with C#11, which has been stored in the second command storage 213, in accordance with the first command format (CF1) of FIG. 3B so as to determine whether an address can be skipped. Assume, for example, that the commands match each other in the control information B1. to the control information BX. of FIG. 3B. In this case, addresses relating to these control information fields can also be skipped in C#12, and the "address-skip command 1-3" (ASC1-3) is determined as an omission command. C#12 is stored in the second command storage 213.

In response to the operation of the omission command generator 214 that corresponds to the second command list 709 above (=CL#1), the transmission command generator 215 in the SP 202 performs a process for generating a transmission command according to the first command format of FIG. 3B. This process is as described above with reference to FIG. 3B in the description of the second embodiment.

In the example of FIG. 10, assume that the second command list 709 (=CL#1) is determined by respective omission commands that corresponds to the three commands C#10, C#11, and C#12. In this case, the content of CL#1 is, for example, the content illustrated in S914 of FIG. 10, and all of the omission commands of C#10, C#11, and C#12 are the address-skip command 1-3 (ASC1-3). Respective commands of 51 bits in total in which the command type value "0x3" indicating ASC1-3 has been set in the first two bits (bit[0:1] in FIG. 3B) are generated.

When the omission command generation processing of the omission command generator 214 and the transmission command generation processing of the transmission command generator 215 have been completed on all of the commands to be transmitted, the transmission command generator 215 performs the following process. The transmission command generator 215 writes all of the stored transmission commands as the command list 709 to the buffer 207 by performing one call for a device driver to the buffer 207 in the control circuit 201.

In FIG. 10, the second command list 709 (=CL#1) that has been generated according to the first command format (CF1), as illustrated in S914 is transferred from a memory (not particularly illustrated) in the SP 202 to the buffer 207 in the control circuit 201 (S915 in FIG. 10).

Then, after transmitting the second command list 709, as described above, the format determination unit 707 performs the following processing on a series of commands before the second transmission processing.

First, the format determination unit 707 calculates a transmission amount that corresponds to the first command format (CF1) of FIG. 3B at the time when the second command list 709 is transmitted. In the example of S914 in FIG. 10, a transmission amount of the second command list 709 (=CL#1) that corresponds to the three commands C#10, C#11, and C#12 is 153 bits (=51+51+51). Accordingly, a transmission amount that corresponds to the first command format (CF1) at the time when the second command list 709 is transmitted is calculated as 153 bits. The format determination unit 707 calculates the size $size_1$ at the time when the second command list 709 is sequentially transmitted to the control circuit 201 according to the first command format (CF1), in accordance with the calculated transmission amount by using expression (9) described above. In expression (9), the transmission amount $s_{10}$ according to the first command format (CF1) that is calculated for a series of commands before transmission processing of this time is 153 bits, which is calculated in S914 of FIG. 10 described above. In addition, the second command list 709 is transmitted this time, and therefore the first transmission amount $s_{11}$ of one time before according to the first command format (CF1) is 242 bits, which is calculated in S905 of FIG. 9, and the transmission amount $s_{12}$ of two times before is 0. Assume, for example, that $\alpha$=0.9. In this case, the transmission amount $size_1$ that corresponds to the first command format (CF1) of FIG. 3B at the time when the second command list 709 of this time is transmitted is calculated as below according to expression (9).

$$size_1 = s_{10} + s_{11} \times \alpha + s_{12} \times \alpha^2 \qquad (15)$$
$$= 153 + 242 \times 0.9 + 0 \times 0.9^2$$
$$\approx 370.8 \text{ bits}$$

Then, the format determination unit 707 calculates a transmission amount under the assumption that a series of command before transmission process, C#10, C#11, and C#12, are sequentially transmitted to the control circuit 201 according to the second command format (CF2) of FIG. 8. Specifically, the format determination unit 707 causes the omission command generator 214 and the transmission command generator 215 to perform operations again on the series of commands before transmission processing, C#10, C#11, and C#12, in accordance with the second command format (CF2) of FIG. 8. In this case, the transmission command generator 215 performs only a process for calculating a transmission amount without performing an actual transmission process. By doing this, as illustrated in S916 of FIG. 10, for example, all of the omission commands of C#10, C#11, and C#12 become the address-skip command 2 (ASC2) of FIG. 8, and the command type value "0x1" indicating ASC2 is set in the first bit (bit[0] in FIG. 8). Consequently, a command of 51 bits in total is generated as each of the omission commands. As a result of the processing above, in the example of S916 in FIG. 10, a transmission amount of a series of commands that correspond to the three commands C#10, C#11, and C#12 that have been processed according to the second command format (CF2) is calculated as 153 bits (=51+51+51). The format determination unit 707 calculates the size $size_2$ under the assumption that the second command list 709 is sequentially transmitted to the control circuit 201 according to the second command format (CF2), in accordance with the calculated transmission amount by using expression (10) described above. In expression (10), the transmission amount $s_{20}$ according to the second command format (CF2) that is calculated for a series of commands before processing of this time is 153 bits, which is calculated in S916 of FIG. 10 described above. In addition, the second command list 709 is transmitted this time, and therefore the first transmission amount $s_{21}$ of one time before according to the second command format (CF2) is 250 bits, which is calculated in S903 of FIG. 9, and the transmission amount $s_{22}$ of two times before is 0. Assume, for example, that $\alpha$=0.9. In this case, the transmission amount $size_2$ that corresponds to the second command format (CF2) of FIG. 8 under the assumption that the second command list 709 of this time is transmitted is calculated as below according to expression (10).

$$size_2 = s_{20} + s_{21} \times \alpha + s_{22} \times \alpha^2 \qquad (16)$$
$$= 153 + 250 \times 0.9 + 0 \times 0.9^2$$
$$= 375 \text{ bits}$$

After the calculation processing above, the format determination unit 707 selects a command format that corresponds to the smaller one of the size $size_1$ that corresponds to the first command format (CF1) and the size $size_2$ that corresponds to the second command format (CF2). According to expression (15) and expression (16) described above, the size $size_1$ that corresponds to CF1 is 370.8 bits, and the size $size_2$ that corresponds to CF2 is 375 bits, as illustrated in S917 of FIG. 10. Therefore, the format determination unit 707 selects the first command format (CF1) according to the determination logic of expression (11) described above. Consequently, the first command format (CF1) is maintained as the command format.

The operation of the control circuit 201 of FIG. 7 is described next.

When transmitting the first command list 709, the command format selector 702 in the control circuit 201 of FIG. 7 selects, for example, the second command format (CF2) illustrated in FIG. 8 as a default command format of the command generation processing. Consequently, the command format selector 702 causes the second command type identification unit 705 and the second interpolation circuit 706 to operate (S907 in FIG. 9).

In FIG. 7, the second command type identification unit 705 in the second interpolation circuit 706 identifies a command type of each of the commands in the first command list 709 that are sequentially read from the buffer 207 in response to an instruction of the buffer controller 208, in accordance with the second command format.

The second interpolation circuit 706 performs the following process according to the command type identified by the second command type identification unit 705. The second interpolation circuit 706 generates a command by interpolating control information that has been omitted from the command read in response to the instruction of the buffer controller 208, by using control information in a previously generated command that has been stored in the command storage 204. The second interpolation circuit 706 outputs the generated command to the buffer controller 208.

In FIG. 7, the command transmitted to the buffer controller 208 is analyzed by the node controller 209, and a node 203 to be controlled is specified from among plural nodes #1 to #16. The node controller 209 transmits the command to the specified node 203 via the JTAG control circuit 210 or the I2C control circuit 211. The specified node 203 executes the received command, and returns a response to the node controller 209 via the JTAG control circuit 210 or the I2C control circuit 211, as needed.

In the example of FIG. 9, the first command list CL#0 is written as the command list 709 from the SP 202 to the buffer 207 (S903→S904 in FIG. 9). The second command type identification unit 705 and the second interpolation circuit 706 sequentially generate respective commands in which control information has been interpolated, in accordance with respective omission commands in CL#0, analyze the respective commands, and sequentially cause the nodes 203 to execute the respective commands (step S908 in FIG. 9).

Specifically, first, an omission command that corresponds to the first command C#00 is read from CL#0 in the buffer 207 in response to the instruction of the buffer controller 208, and the omission command is transmitted to the second interpolation circuit 706 via the format selector 702. The second command type identification unit 705 in the second interpolation circuit 706 identifies a command type added in the first bit (bit[0] in FIG. 8) of the omission command that corresponds to the command C#00, in accordance with the second command format (CF2) of FIG. 8. Consequently, the second command type identification unit 705 determines that the omission command that corresponds to C#00 is the direct command 2 (DC2) of FIG. 8 (see S903 in FIG. 9). As a result of this, the second interpolation circuit 706 does not interpolate the control information from the command storage 204, but outputs, to the buffer controller 208, the direct command 2 (DC2) that has been stored in the second bit and the subsequent bits of the omission command that corresponds to C#00 with no change as a command of this time. The second interpolation circuit 706 stores the command of this time that has been generated so as to correspond to the command C#00 in the command storage 204. The command output to the buffer controller 208 is transmitted from the node controller 209 via the JTAG control circuit 210 or the I2C control circuit 211 to a node 203 that will execute the command. When the node controller 209 receives a response to the execution of the command from the node 203 that has executed the command via the JTAG control circuit 210 or the I2C control circuit 211, the node controller 209 transmits the response to the SP 202 (S909 in FIG. 9). The node controller 209 may temporarily store the response in a specified area within the buffer 207 via the buffer controller 208. In this case, after all of the responses that correspond to CL#0 are collected as a response list, the response list may be transmitted from the buffer 207 to the SP 202.

Then, an omission command that corresponds to the second command C#01 is read from CL#0 in the buffer 207 in accordance with an instruction of the buffer controller 208, and the omission command is transmitted to the second interpolation circuit 706 via the format selector 702. The second command type identification unit 705 in the second interpolation circuit 706 identifies a command type added in the first bit (bit[0] in FIG. 8) of the omission command that corresponds to the command C#01, in accordance with the second command format (CF2) of FIG. 8. As a result of this, the second command type identification unit 705 determines that the omission command that corresponds to C#01 is the address-skip command 2 (ASC2) of FIG. 8 (see S903 in FIG. 9). Upon receipt of this determination result, the second interpolation circuit 706 extracts the address-skip command 2 (ASC2) of FIG. 8 that has been stored in the second bit and the subsequent bits of the omission command. In addition, the second interpolation circuit 706 extracts the control information B1. to the control information BX. of FIG. 8 from the previously generated command that corresponds to C#00 and that has been stored in the command storage 204. The second interpolation circuit 706 interpolates the control information B1. to the control information BX. into the address-skip command 2 (ASC2), and outputs the obtained command as a command of this time to the buffer controller 208. The second interpolation circuit 706 stores the command of this time that has been generated so as to correspond to the command C#01 in the command storage 204. The subsequent processing performed on the command of this time that has been generated so as to correspond to the command C#01 is similar to the processing in the case of the command generated for CL#00.

Further, an omission command that corresponds to the third command C#02 is read from CL#0 in the buffer 207 in accordance with an instruction of the buffer controller 208, and the omission command is transmitted to the second interpolation circuit 706 via the format selector 702. The second command type identification unit 705 in the second interpolation circuit 706 identifies a command type added in the first bit (bit[0] in FIG. 8) of the omission command that corresponds to the command C#02 in accordance with the second command format (CF2) of FIG. 8. Asa result of this, the second command type identification unit 705 determines that the omission command that corresponds to C#02 is the direct command 2 (DC2) of FIG. 8 (see S903 in FIG. 9). Upon receipt of the determination result, the second interpolation circuit 706 does not interpolate control information from the command storage 204, but outputs the direct command 2 (DC2) that has been stored in the second bit and the subsequent bits of the omission command that corresponds to C#02 with no change as a command of this time to the buffer controller 208. The second interpolation circuit 706 stores the command of this time that has been generated so as to correspond to the command C#02 in the command storage 204. The subsequent processing performed on the command of this time that has been generated so as to correspond to the command C#02 is similar to the processing in the case of each of the commands generated for CL#00 and CL#01.

After each of the commands that correspond to the first command list 709 is generated (restored), as described above, the each-format buffer consumed amount counter 701 of FIG. 7 performs the following processing on a series of commands that are generated and are sequentially stored in the command storage 204 by the second interpolation circuit 706.

First, the each-format buffer consumed amount counter 701 calculates a transmission amount that corresponds to the second command format (CF2) of FIG. 8 under the assumption that the series of commands generated for the first command list 709 are transmitted from the SP 202 to the control circuit 201. In the example of S910 in FIG. 9, a transmission amount of the first command list 709 (=CL#0) that corresponds to the three commands C#00, C#01, and C#02 is the size of CL#0 stored in the buffer 207. Accordingly, the each-format buffer consumed amount counter 701 calculates the transmission amount of CL#0 by counting the sum of the data sizes of respective omission commands in the first command list 709 (=CL#0) that have been read into the second interpolation circuit 706. This transmission amount is 250 bits (=100+50+100), as illustrated in S903 of FIG. 9. The each-format buffer consumed amount counter 701 calculates the size $SIZE_2$ at the time when the first command list 709 is sequentially transmitted to the control circuit 201 according to the second command format (CF2), in accordance with the calculated transmission amount by using expression (4) described above. In expression (4), the transmission amount $S_{20}$ according to the second command format (CF2) that is calculated for the series of commands generated this time is 250 bits, which is the same as that in S903 of FIG. 9 described above. In addition, the process of this time is a process for generating a series of commands for the first command list 709, and therefore both the transmission amount $S_{21}$ of one time before and the transmission amount $S_{22}$ of two times before according to the second command format (CF2) are 0. Assume, for example, that $\alpha=0.9$. In this case, the transmission amount $SIZE_2$ that corresponds to the second command format (CF2) of FIG. 8 at the time when a series of commands are generated from the first command list 709 of this time, is calculated as below according to expression (4).

$$size_2 = s_{20} + s_{21} \times \alpha + s_{22} \times \alpha^2 \qquad (17)$$
$$= 250 + 0 \times 0.9 + 0 \times 0.9^2$$
$$= 250 \text{ bits}$$

The each-format buffer consumed amount counter 701 calculates a transmission amount under the assumption that the series of commands generated for the first command list 709 are sequentially transmitted from the SP 202 to the control circuit 201 according to the first command format (CF1) of FIG. 3B. Specifically, the each-format buffer consumed amount counter 701 includes processing units such as the omission command generator 214 and the transmission command generator 215 in the SP 202, although these are not particularly illustrated. However, the transmission command generator 215 does not perform an actual transmission process, but performs only a process for calculating a transmission amount. The each-format buffer consumed amount counter 701 causes the omission command generator 214 and the transmission command generator 215 to perform an operation on the series of commands that have been generated so as to correspond to C#00, C#01, and C#02 according to the first command format (CF1) of FIG. 3B. The series of commands that have been generated so as to correspond to C#00, C#01, and C#02 by the second interpolation circuit 706 are sequentially stored in the command storage 204, and therefore the each-format buffer consumed amount counter 701 obtains data of these commands from the command storage 204. Consequently, as illustrated in S911 of FIG. 9, an omission command of C#00 becomes the direct command 2 (DC1) of FIG. 3B, the command type value "0x0" indicating DC1 is set in the first two bits (bit[0:1] in FIG. 3B), and a command of 101 bits in total is generated. In addition, an omission command of C#01 becomes the address-skip command 1-3 (ASC1-3) of FIG. 3B, the command type value "0x3" indicating ASC1-3 is set in the first two bits (bit[0:1] in FIG. 3B), and a command of 51 bits in total is generated. Further, an omission command of CO2# becomes the address-skip command 1-1 (ASC1-1) of FIG. 3B, and the command type value "0x1" indicating ASC1-1 is set in the first two bits (bit[0:1] in FIG. 3B), and a command of 90 bits in total is generated. Asa result of the processing above, in the example of S911 of FIG. 9, a transmission amount of the series of commands that correspond to the three commands C#00, C#01, and CO2# that have been processed according to the first command format (CF1) is calculated as 242 bits (=101+51+90). The each-format buffer consumed amount counter 701 calculates the size $SIZE_1$ under the assumption that the first command list 709 is sequentially transmitted to the control circuit 201 according to the first command format (CF1), in accordance with the transmission amount by using expression (3) described above. In expression (9), the transmission amount $S_{10}$ according to the first command format (CF1) that is calculated for the series of commands generated this time is 242 bits, which is calculated in S911 of FIG. 9 described above. The process of this time is a process for generating a series of commands for the first command list 709, and therefore both the transmission amount $S_{21}$ of one time before and the transmission amount $S_{22}$ of two times before according to the first command format (CF1) are 0. Assume, for example, that $\alpha=0.9$. In this case, the transmission amount $SIZE_1$ that corresponds to the first command format (CF1) of FIG. 3B under the assumption that the first command list 709 of this time is transmitted is calculated as below according to expression (3).

$$size_1 = s_{10} + s_{11} \times \alpha + s_{12} \times \alpha^2 \qquad (18)$$
$$= 242 + 0 \times 0.9 + 0 \times 0.9^2$$
$$= 242 \text{ bits}$$

After the calculation processing above, the format selector 702 of FIG. 7 selects a command format that corresponds to the smaller one of the size $SIZE_1$ that corresponds to the first command format (CF1) and the size $SIZE_2$ that corresponds to the second command format (CF2). According to expression (17) and expression (18) described above, the size $SIZE_1$ that corresponds to CF1 is 242 bits, and the size $SIZE_2$ that corresponds to CF2 is 250 bits, as illustrated in S912 of FIG. 9. Therefore, the format selector 702 selects the first command type identification unit 703 and the first interpolation circuit 704 that operate according to the first command format (CF1) in accordance with the determination logic of expression (5) described above. Consequently, a command format in the generation of a command is changed from the second command format (CF2) to the first command format (CF1).

As described above, the control circuit 201 selects the first command format (CF1) for CL#0 according to the determination logic of expression (5) by using expression (17) and expression (18) (S910, S911, and S912 in FIG. 9). In addition, the SP 202 selects the first command format (CF1) for the same CL#0 according to the determination logic of expression (11) by using expression (13) and expression (14), as described above (S903, S905, and S906 in FIG. 9). Accordingly, it can be seen that, after transmitting CL#0 in S904 of FIG. 9, both the SP 202 and the control circuit 201 can switch the command format to the first command format (CF1) in such a way that the size of a command list 709 to be transmitted the subsequent time is minimized.

The operation of the control circuit 201 at the time of transmitting the second command list 709 (=CL#1) is described next.

In S914→S915 of FIG. 10, the second command list CL#1 is written as the command list 709 form the SP 202 to the buffer 207. When the buffer controller 208 issues an instruction to read CL#1 from the buffer 207, the format selector 702 switches the command format to the first command format (CF1) at the time of generating a command that corresponds to CL#0, as described above. Consequently, when each of the omission commands in CL#1 is read from the buffer 207 in response to the instruction of the buffer controller 208, the format selector 702 causes the first command type identification unit 703 and the first interpolation circuit 704 to operate. The first command type identification unit 703 and the first interpolation circuit 704 sequentially generate respective commands in which control information has been interpolated, in accordance with respective omission commands in CL#1, analyze the respective commands, and sequentially cause the nodes 203 to execute the respective commands (step S918 in FIG. 10).

Specifically, first, an omission command that corresponds to the first command C#10 is read from CL#1 in the buffer 207 in response to an instruction of the buffer controller 208, and the omission command is transmitted to the first interpolation circuit 704 via the format selector 702. The first command type identification unit 703 in the first interpolation circuit 704 identifies a command type added in the first two bits (bit[0:1] in FIG. 3B) of the omission command that corresponds to C#10, in accordance with the first command format (CF1) of FIG. 3B. Consequently, the first command type identification unit 703 determines that the omission command that corresponds to C#10 is the address-skip command 1-3 (ASC1-3) of FIG. 3B (see S914 in FIG. 10). Upon receipt of this determination result, the first interpolation circuit 704 first extracts the address-skip command 1-3 (ASC1-3) of FIG. 3B that has been stored in the second bit and the subsequent bits of the omission command. In addition, the first interpolation circuit 704 extracts the control information B1. to the control information BX. of FIG. 3B from the previously generated command that corresponds to C#02 and that has been stored in the command storage 204. The first interpolation circuit 704 interpolates the control information B1. to the control information BX. into the address-skip command 1-3 (ASC1-3), and outputs the obtained command as a command of this time to the buffer controller 208. The first interpolation circuit 704 stores the command of this time that has been generated so as to correspond to the command C#10 in the command storage 204. The command output to the buffer controller 208 is transmitted from the node controller 209 via the JTAG control circuit 210 or the I2C control circuit 211 to a node 203 that will execute the command. When the node controller 209 receives a response to the execution of the command from the node 203 that has executed the command via the JTAG control circuit 210 or the I2C control circuit 211, the node controller 209 transmits the response to the SP 202 (S919 in FIG. 10). The node controller 209 may temporarily store the response in a specified area in the buffer 207 via the buffer controller 208. In this case, after all of the responses that correspond to CL#1 are collected as a response list, the response list may be transmitted from the buffer 207 to the SP 202.

Then, an omission command that corresponds to the second command C#11 is read from CL#1 in the buffer 207 in accordance with an instruction of the buffer controller 208, and the omission command is transmitted to the first interpolation circuit 704 via the format selector 702. The first command type identification unit 703 in the first interpolation circuit 704 identifies a command typed added in the first two bits (bit[0:1] in FIG. 3B) of the omission command that corresponds to the command C#11, in accordance with the first command format (CF1) of FIG. 3B. Consequently, the first command type identification unit 703 determines that the omission command that corresponds to C#11 is the address-skip command 1-3 (ASC1-3) of FIG. 3B (see S914 in FIG. 10). Upon receipt of this determination result, the first interpolation circuit 704 first extracts the address-skip command 1-3 (ASC1-3) of FIG. 3B that has been stored in the second bit and the subsequent bits of the omission command. In addition, the first interpolation circuit 704 extracts the control information B1. to the control information BX. of FIG. 3B from the previously generated command that corresponds to C#10 and that has been stored in the command storage 204. The first interpolation circuit 704 interpolates the control information B1. to the control information BX. into the address-skip command 1-3 (ASC1-3), and outputs the obtained command as a command of this time to the buffer controller 208. The first interpolation circuit 704 stores the command of this time that has been generated so as to correspond to the command C#11 in the command storage 204. The subsequent processing performed on the command of this time that has been generated so as to correspond to the command C#11 is similar to the processing in the case of the command generated for CL#10.

Further, an omission command that corresponds to the third command C#12 is read from CL#1 in the buffer 207 in accordance with an instruction of the buffer controller 208, and the omission command is transmitted to the first interpolation circuit 704 via the format selector 702. The first command type identification unit 703 in the first interpolation circuit 704 identifies a command type added in the first two bits (bit[0:1] in FIG. 3B) of the omission command that corresponds to the command C#12, in accordance with the second command format (CF2) of FIG. 3B. Consequently, the first command type identification unit 703 determines that the omission command that corresponds to C#12 is the address-skip command 1-3 (ASC1-3) of FIG. 3B (see S914 in FIG. 10). Upon receipt of this determination result, the first interpolation circuit 704 first extracts the address-skip command 1-3 (ASC1-3) of FIG. 3B that has been stored in the second bit and the subsequent bits of the omission command. In addition, the first interpolation circuit 704 extracts the control information B1. to the control information BX. of FIG. 3B from the previously generated command that corresponds to C#11 and that has been stored in the command storage 204. The first interpolation circuit 704 interpolates the control information B1. to the control information BX. into the address-skip command 1-3 (ASC1-3), and outputs the obtained command as a command of this time to the buffer controller 208. The first interpolation circuit 704 stores the command of this time that has been generated so as to correspond to the command C#12 in the command storage 204. The subsequent processing performed on the command of this time that has been generated so as to correspond to the command C#12 is similar to the processing in the case of the command generated for CL#10 or CL#11.

After respective commands that correspond to the second command list 709 are generated (restored), as described above, the each-format buffer consumed amount counter 701 of FIG. 7 performs the following processing on a series of commands that are generated by the first interpolation circuit 704 and that are sequentially stored in the command storage 204.

First, the each-format buffer consumed amount counter 701 calculates a transmission amount that corresponds to the first command format (CF1) of FIG. 3B under the assumption that a series of command generated for the second command list 709 are transmitted from the SP 202 to the control circuit 201. In the example of S920 in FIG. 10, a transmission amount of the second command list 709 (=CL#1) that corresponds to the three commands C#10, C#11, and C#12 is the size of CL#1 that has been stored in the buffer 207. Accordingly, the each-format buffer consumed amount counter 701 calculates the transmission amount of CL#1 by counting the sum of the data sizes of respective omission commands in the second command list 709 (=CL#1) that have been read into the first interpolation circuit 704. This transmission amount is 153 bits (=51+51+51), as illustrated in S914 of FIG. 10. The each-format buffer consumed amount counter 701 calculates the size $SIZE_1$ at the time of sequentially transmitting the second command list 709 to the control circuit 201 according to the first command format (CF1), in accordance with the calculated transmission amount by using expression (3) described above. In expression (3), the transmission amount $S_{10}$ according to the first command format (CF1) that has been calculated for the series of commands generated this time is 153 bits, which is the same as the transmission amount in S914 of FIG. 10 described above. In addition, the process of this time is a process for generating a series of commands for the second command list 709, and therefore the first transmission amount $S_{11}$ of one time before according to the first command format (CF1) is 242 bits, which is calculated in S911 of FIG. 9, and the transmission amount $S_{12}$ of two times before is 0. Assume, for example, that $\alpha=0.9$. In this case, the transmission amount $SIZE_1$ that corresponds to the first command format (CF1) of FIG. 3B at the time when a series of commands are generated from the first command list 709 of this time is calculated as below according to expression (3).

$$size_1 = s_{10} + s_{11} \times \alpha + s_{12} \times \alpha^2 \quad (19)$$
$$= 153 + 242 \times 0.9 + 0 \times 0.9^2$$
$$= 370.8 \text{ bits}$$

Then, the each-format buffer consumed amount counter 701 calculates a transmission amount under the assumption that the series of commands generated for the second command list 709 are sequentially transmitted from the SP 202 to the control circuit 201 according to the second command format (CF2) of FIG. 8. The each-format buffer consumed amount counter 701 causes the incorporated omission command generator 214 and transmission command generator 215 to perform operations on the series of commands that have been generated so as to correspond to C#10, C#11, and C#12 according to the second command format (CF2) of FIG. 8. The series of commands that have been generated by the first interpolation circuit 704 so as to correspond to C#10, C#11, and C#12 are sequentially stored in the command storage 204, and therefore the each-format buffer consumed amount counter 701 obtains data of these commands from the command storage 204. Consequently, as illustrated in S921 of FIG. 10, all of respective omission commands of C#10, C#11, and C#12 become the address-skip command 2 (DC2) of FIG. 8, and the command type value "0x1" indicating ASC2 is set in the first bit (bit[0] in FIG. 8). Respective commands of 50 bits in total are generated. As a result of the processing above, in the example of S921 in FIG. 10, a transmission amount of the series of commands that correspond to the three commands C#10, C#11, and C#12 and that have been processed according to the second command format (CF2) is calculated as 150 bits (=50+50+50). The each-format buffer consumed amount counter 701 calculates the size $SIZE_2$ under the consumption that the second command list 709 is sequentially transmitted to the control circuit 201 according to the second command format (CF2), in accordance with this transmission amount by using expression (4) described above. In expression (4), the transmission mount $S_{20}$ according to the second command format (CF2) that has been calculated for the series of commands generated this time is 150 bits, which is calculated in S921 of FIG. 10 described above. The process of this time is a process for generating a series of commands for the second command list 709, and therefore the first transmission amount $S_{21}$ of one time before according to the second command format (CF2) is 250 bits, which is calculated in S910 of FIG. 9, and the transmission amount $S_{22}$ of two times before is 0. Assume, for example, that $\alpha=0.9$. In this case, the transmission amount $SIZE_2$ that corresponds to the second command format (CF2) of FIG. 8 under the assumption that the first command list 709 of this time is transmitted is calculated as below according to expression (4).

$$size_2 = s_{20} + s_{21} \times \alpha + s_{22} \times \alpha^2 \quad (20)$$
$$= 150 + 250 \times 0.9 + 0 \times 0.9^2$$
$$= 375 \text{ bits}$$

After the calculation processing above, the format selector 702 of FIG. 7 selects a command format that corresponds to the smaller one of the size $SIZE_1$ that corresponds to the first command format (CF1) and the size $SIZE_2$ that corresponds to the second command format (CF2). According to expression (19) and expression (20) described above, the size $SIZE_1$ that corresponds to CF1 is 370.8 bits, and the size $SIZE_2$ that corresponds to CF2 is 375 bits, as illustrated in S922 of FIG. 10. Therefore, the format selector 702 selects the first command type identification unit 703 and the first interpolation circuit 704 that operate according to the first command format (CF1) in accordance with the determination logic of expression (5) described above. Consequently, the first command format (CF1) is maintained as a command format for the generation of a command.

As described above, the control circuit 201 selects the first command format (CF1) for CL#0 according to the determination logic of expression (5) by using expression (19) and expression (20) (S920, S921, and S922 in FIG. 10). The SP 202 also selects the first command format (CF1) for the same CL#0 according to the determination logic of expression (11) by using expression (15) and expression (16) (S914, S916, and S917 in FIG. 10). Accordingly, it can be seen that, after CL#1 is transmitted in S915 of FIG. 10, both the SP 202 and the control circuit 201 can perform selection so as to maintain the first command format (CF1) in such a way that the size of a command list 709 to be transmitted the subsequent time is minimized.

FIG. 11 is a flowchart illustrating an example of the transmission command generation processing performed by the SP 202 of FIG. 7 according to the third embodiment. This processing is processing in which a CPU (not particularly illustrated) in the SP 202 executes a command generation processing program stored in a memory (not particularly illustrated).

In the flowchart of FIG. 11, steps in which the same process as the process in the flowchart of FIG. 5 according to the second embodiment are denoted by the same step numbers as the numbers in the case of FIG. 5.

The flowchart of FIG. 11 is different from the flowchart of FIG. 5 in that steps S1101 and S1102 are added.

First, after a transfer instruction is issued (the determination result in step S501 is YES), the SP 202 sequentially reads one command from a command list in the SP 202 (step S502), and repeatedly performs the processes of steps S504 to S506. In step S504, the SP 202 performs an omission command generation process that corresponds to the omission command generator 214 of FIG. 7. Then, the SP 202 performs a transmission command generation process that corresponds to the transmission command generator 215 of FIG. 7 in step S505. The SP 202 performs a process for storing a command of this time in the second command storage 213 in step S506. These processes are as described above.

As a result of repeating the operation above, when the determination in step S503 becomes NO, and it is determined that there are no commands that have not been processed, the following process is performed. The SP 202 transfers a command group that has been stored in a storage area of a memory in the SP 202 in the process of step S505 as a command list 709 (FIG. 7) to the buffer 207 in the control circuit 201 (step S507).

The SP 202 performs the processing of the format determination unit 707 of FIG. 7 (steps S1101 and S1102 in FIG. 11).

First, the SP 202 calculates respective transmission amounts under the assumption that a series of commands before transmission processing of the time before this time are sequentially transmitted from the SP 202 to the buffer 207 in the control circuit 201 according to the first command format and the second command format. The omission command generator 214 calculates respective sizes according to the first and second command formats in accordance with the respective transmission amounts above (step S1101). Details of this process are as described above by using S903 and S905 of FIG. 9 or S914 and S916 of FIG. 10.

The SP 202 determines either the first command format or the second command format in accordance with the respective sizes calculated in step S1101 by using a specified algorithm. Details of this process are as described above by using S906 of FIG. 9 or S917 of FIG. 10.

The processing of the SP 202 returns to the process of step S1101. When the determination of step S1101 becomes YES and a process for transmitting the next command list is performed, the command format determined in step S1102 is selected, and the omission command determination process of step S504 and the transmission command generation process of step S505 are performed.

FIG. 12 is a flowchart illustrating an example of reception command generation/execution processing performed by the control circuit 201 of FIG. 7 according to the third embodiment. FIG. 12 illustrates, for example, a series of execution operations of FPGAs that configure the control circuit 201 in the form of a flowchart.

In the flowchart of FIG. 12, steps in which the same process as the process in the flowchart of FIG. 6 according to the second embodiment is performed are denoted by the same step numbers as the number in the case of FIG. 6.

Differences between the processing of the flowchart of FIG. 12 and the processing of the flowchart of FIG. 6 according to the second embodiment are steps S1201 and S1202.

First, similarly to the case of FIG. 6, an FPGA block that corresponds to the node controller 209 of FIG. 7 receives an instruction to execute a command list 709 transferred from the SP 202 to the buffer 207 (the determination in step S601 is YES). An FPGA block that corresponds to the buffer controller 208 issues, to the buffer 207, an instruction to read a command from the command list 709 (step S602), and repeatedly performs the processes of step S604 to step S607. An FPGA of the first command type identification unit 703 or the second command type identification unit 705 that corresponds to a currently selected command format performs a process for identifying a command type of a read omission command (step S604). An FPGA of the first interpolation circuit 704 or the second interpolation circuit 706 that corresponds to the currently selected command format performs a process for interpolating control information into the omission command and a process for storing the generated command in the command storage 204 of FIG. 7 (steps S605 and S606). FPGAs of the node controller 209, and the JTAG control circuit 210 or the I2C control circuit 211 perform a process for transmitting, to a target node 203, a command that has been output from the first interpolation circuit 704 or the second interpolation circuit 706 to the buffer controller 208 and for causing the command to be executed (step S607). These processes are as described above.

As a result of repeating the operations above, when the determination in step S603 becomes NO and it is determined that there are no commands that have not been processed, the processing of the each-format buffer consumed amount counter 701 and the format selector 702 of FIG. 7 is performed (steps S1201 and S1202 in FIG. 12).

First, an FPGA of the each-format buffer consumed amount counter 701 performs the following process. Respective transmission amounts under the assumption that a series of commands generated the time previous to this time are sequentially transmitted from the SP 202 to the buffer 207 in the control circuit 201 according to the first command format and the second command format. Respective sizes according to the first and second command formats are calculated in accordance with the respective transmission amounts (step S1201). Details of this process is as described above by using S910 and S911 of FIG. 9 or S920 and S921 of FIG. 10.

An FPGA of the format selector 702 performs the following process. Either the first command format or the second command format is determined according to the respective sizes calculated in step S1201 by using a specified algorithm (step S1202). Details of this process is as described above by using S912 of FIG. 9 or S922 of FIG. 10.

Control returns to the process of step S1201. When the determination in step S1201 becomes YES and a process for generating a command from the next command list is performed, control is performed according to the command format determined in step S1202. Specifically, either the first command type identification unit 703 and the first interpolation circuit 704 or the second command type identification unit 705 and the second interpolation circuit 706 that correspond to the selected command format perform the processes of steps S604 and S605.

FIG. 13 illustrates an example of a command format of a conventional device that transmits all of the following fields as control information from the SP 202 of FIG. 2 to the buffer 207 in the control circuit 201.

A. Destination information (Controller, Slave Address)
B. Register address length information (Header Length)
C. Register address information (Header)
D. Data length information (Data Length)
E. Data information (Data)
F. Information relating to the presence/absence of CRC or the presence/absence of Count
G. Read or Write information FIG. 14 illustrates an example of a command format according to the embodiments in which A., B., or F. described below of control information is skipped when the following fields are the same in continuous commands.

A. Destination information (Controller, Slave Address)
B. Register address length information (Header Length)
F. Information relating to the presence/absence of CRC or the presence/absence of Count Further, FIG. 15 is a diagram in which the size of a command to be transmitted is compared between the conventional device of FIG. 13 and the embodiments of FIG.

14. Assume, for example, that one direct command and 199 address-skip commands are generated by using a register address of 1 byte, a data length of 1 byte, and 200 writing operations according to the embodiments. In this case, the size of a command list to be transmitted to the buffer 207 of FIG. 2 is 602 bytes, as illustrated in the field "total", and a processing amount is 60% of 1000 bytes of the conventional device, as illustrated similarly in the field "total", and a processing load is greatly improved.

In the embodiments described above, a plurality of nodes 203 are implemented in FIG. 2 or FIG. 7, but only one node may be implemented.

In the third embodiment, two types of command formats illustrated in FIG. 3B and FIG. 8 are employed, but three or more types of command formats may be employed.

In the third embodiment, in calculating a transmission size by using a forgetting factor (expressions (3), (4), (9), and (10)), after transmission sizes are calculated from transmission amounts of this time, one time before, and two times before, transmission amounts of other times may be referred to.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A parallel processing device comprising:
   a management unit;
   a plurality of processing nodes each of which performs processes according to respective commands, the commands each including control information; and
   a controller that controls each of the plurality of nodes in accordance with a first command transmitted from the management unit, the first command being one of the commands from which the control information may be omitted, wherein
   the controller includes:
      a command storage that stores a second command as a command generated previously by the controller, the second command being one of the commands;
      a command type identification unit that identifies a command type of the first command transmitted from the management unit, the command type indicating an omission form of the control information from the first command; and
      a command generator that generates a third command from the first command by using the second command according to the command type, the third command being one of the commands and being one of the commands to be stored in the command storage as the second command.

2. The parallel processing device according to claim 1, wherein
   the command generator generates the third command by interpolating control information omitted from the first command by using control information in the second command stored in the command storage.

3. The parallel processing device according to claim 1, wherein
the controller further includes:
   an each-format size calculator that calculates respective transmission data amounts for the second command when it is assumed that the second command is transmitted from the management unit to the controller according to respective plural command formats, and that calculates, from the respective transmission data amounts, respective data sizes corresponding to the respective plural command formats when it is assumed that the second command is transmitted from the management unit to the controller according to the respective plural command formats; and
   a format selector that selects one of the plural command formats in accordance with the respective data sizes calculated by the each-format size calculator, and
   the command type identification unit and the command generator operate according to the command format selected by the format selector when generating the third command.

4. The parallel processing device according to claim 3, wherein
   the format selector compares the respective data sizes, and selects a command format that corresponds to a smallest data size among the respective data sizes.

5. The parallel processing device according to claim 1, wherein
   the management unit includes:
      a second command storage that stores a fourth command before processing of a command transmitted a previous time;
      an omission command generator that generates an omission command obtained by omitting specified control information from a command to be transmitted in accordance with the fourth command; and
      a transmission command generator that generates a transmission command obtained by adding information indicating a form of omission performed by the omission command generator as the command type to the omission command, and that transmits the transmission command to the controller.

6. The parallel processing device according to claim 5, wherein
   the management unit further includes:
      a format determination unit that calculates respective transmission data amounts for the fourth command when it is assumed that the fourth command is transmitted to the controller according to respective plural command formats, that calculates, from the respective transmission data amounts, respective data sizes corresponding to the respective plural command formats when it is assumed that the fourth command is transmitted to the controller according to the respective plural command formats, and that determines one of the plural command formats by using a same specified algorithm as an algorithm when the controller selects a command format in accordance with the respective data sizes,
   the omission command generator generates a series of omission commands according to the command format determined by the format determination unit, when transmitting the third command, and
   the transmission command generator generates a series of transmission commands according to the command format determined by the format selector, and transmits the series of transmission commands to the controller.

7. The parallel processing device according to claim 6, wherein
the format determination unit multiplies, for each of the plural command formats, the transmission data amount of each of a plurality of times including this time and previous times by a specified factor that corresponds to each of the plurality of times, and calculates the data size corresponding to each of the plural command formats as an addition result obtained by summing multiplication results of the plurality of times.

8. The parallel processing device according to claim 1, wherein
the controller further includes:
   a buffer that stores the first command transmitted from the management unit to the controller; and
   a buffer controller that issues, to the buffer, an instruction to sequentially read the first command in accordance with an execution instruction from the management unit,
the command type identification unit identifies a command type of the first command read according to the instruction of the buffer controller,
the command generator includes an interpolation circuit that generates the third command by interpolating control information omitted from the read first command by using control information in the second command stored in the command storage, and
the controller further includes:
   a node controller that issues, to one of the plurality of processing nodes, an instruction to perform a process according to the third command that has been generated by the interpolation circuit and that has been input to the buffer controller, and that reports a result of executing the third command in the one of the plurality of processing nodes to the management unit.

9. The parallel processing device according to claim 8, wherein
after the command generator generates the third command, the management unit causes the buffer controller to write the generated third command to the buffer in the controller.

10. A method for controlling a parallel processing device that includes a management unit, a plurality of processing nodes each of which performs processes according to respective commands, and a controller that controls each of the plurality of processing nodes in accordance with a first command transmitted from the management unit, the commands each including control information, the first command being one of the commands from which the control information may be omitted, the method comprising:
   storing, by the controller, a second command, as a command generated previously by the controller, to a command storage, the second command being one of the commands;
   identifying, by the controller, a command type of the first command transmitted from the management unit, the command type indicating an omission form of the control information from the first command; and
   generating, by the controller, a third command by using the second command according to the command type, the third command being one of the commands and being one of the commands to be stored in the command storage as the second command.

11. The method according to claim 10, further comprising:
   storing, by the management unit, a fourth command before processing of a command transmitted a previous time;
   generating, by the management unit, an omission command obtained by omitting specified control information from a command to be transmitted in accordance with the fourth command; and
   generating, by the management unit, a command obtained by adding information indicating a form of omission as the command type to the omission command, and transmitting the command to the controller.

12. A controller used by a parallel processing device that includes a management unit and a plurality of processing nodes, the plurality of processing nodes each performing processes according to respective commands, the commands each including control information, the controller comprising:
   a command storage that stores a second command, as a command generated previously by the controller, the second command being one of the commands;
   a command type identification unit that identifies a command type of a first command transmitted from the management unit, the first command being one of the commands from which the control information may be omitted, the command type indicating an omission form of the control information from the first command; and
   a command generator that generates a third command by using the second command according to the command type, the third command being one of the commands and being one of the commands to be stored in the command storage as the second command.

* * * * *